United States Patent [19]

Leung et al.

[11] Patent Number: 4,891,835
[45] Date of Patent: Jan. 2, 1990

[54] METHOD AND DEVICE FOR RECORDING AND REPLAYING AUDIO COMMUNICATIONS

[75] Inventors: Keith K. W. Leung; Kathleen Quinn, both of Norwalk, Conn.; John D. Goldson, Mt. Vernon, N.Y.; Wayne C. Hoffman, Norwalk, Conn.

[73] Assignee: Dictaphone Corporation, Stratford, Conn.

[21] Appl. No.: 857,844

[22] Filed: Apr. 30, 1986

[51] Int. Cl.$^4$ ............................................. H04M 1/64
[52] U.S. Cl. ....................................... 379/88; 379/45; 379/51; 379/73
[58] Field of Search ......................... 379/41, 45, 48, 51, 379/67, 84, 88, 89, 110, 73; 369/2, 14, 24, 83; 360/32

[56] References Cited

U.S. PATENT DOCUMENTS

| | | | |
|---|---|---|---|
| 4,359,607 | 11/1982 | Hannig et al. | 379/88 |
| 4,375,083 | 2/1983 | Maxemchuk | 364/900 |
| 4,514,593 | 4/1985 | Hattori et al. | 379/74 |
| 4,625,081 | 11/1986 | Lotito et al. | 379/88 |
| 4,627,001 | 12/1986 | Stapleford et al. | 364/513.5 |
| 4,646,346 | 2/1987 | Emerson et al. | 379/214 |

FOREIGN PATENT DOCUMENTS

| | | | |
|---|---|---|---|
| 3239881 | 4/1984 | Fed. Rep. of Germany | 379/88 |
| 0089060 | 3/1984 | Japan | 379/67 |

OTHER PUBLICATIONS

"Voice Messaging Systems Promise to Become More than Empty Words", B. L. Follett, *TELEPHONY*, Apr. 5, 1982, pp. 38, 39 [379/89].

"Application of Speech Recognition and Synthesis to PABX Services", Mulla and Vaughan, *Electrical Communication*, vol. 59, No. 3, May 1985, pp. 273-280 [379/88].

Primary Examiner—Thomas W. Brown
Attorney, Agent, or Firm—Robert H. Whisker; Melvin J. Scolnick; David E. Pitchenik

[57] ABSTRACT

A device according to the invention is compatible with conventional magnetic tape loggers. Such a device is termed a message repeater, and it records and replays audio signals forming messages on a message channel, such as a telephone line or a radio channel. The message repeater includes circuits for converting the audio signals on a particular channel into corresponding digital signals and circuits for storing the digital signals. The message repeater also includes circuits for selectively recalling the signals that were stored and circuits for converting the signals that were recalled into analog audio signals. Messages on the selected message channel may be recorded and later replayed by the message repeater. Preferably, the message repeater includes a display with indications of the relative locations and lengths of the stored messages as well as a cursor or index. Furthermore, the message repeater preferably permits a selected message to be saved, thereby allowing the selected message to be replayed at the convenience of the operator. Additionally, the message repeater advantageously has fault detection circuits for determining if a fault has occurred in the other circuits.

45 Claims, 12 Drawing Sheets

METHOD AND DEVICE FOR RECORDING AND REPLAYING AUDIO COMMUNICATIONS

BACKGROUND OF THE INVENTION

This invention relates, in general, to recording and replaying audio or voice communications and, more particularly, to devices and methods in which digital signals representative of messages are stored and then retrieved in order to reproduce the messages.

Typically, a magnetic tape logger is a multi-channel, reel-to-reel tape recorder that is capable of concurrently recording signals from up to about forty channels. Police and fire departments, medical emergency services, public safety services, airlines, and trucking firms, among others, may employ a magnetic tape logger. Generally, the logger will be connected to a number of telephone lines and/or a number of radio channels so that all incoming messages may be recorded. The logger may operate continuously for twelve or more hours. Once the logger is stopped, the tape may be rewound to permit a particularly important message to be replayed.

However, since the magnetic tape logger typically operates continuously for a relatively long time, a particular message may not be readily accessible by the operator or the operator's supervisor. In other words, the operator may not be able to replay a desired message until a convenient stopping point for the logger is reached. Thus, the playback of especially significant messages may be delayed.

Accordingly, a need exists for an apparatus and a method for allowing messages to be recorded and replayed when desired, without any delay. Such an apparatus may be used along with a magnetic tape logger to allow the operator to review significant messages at the operator's convenience.

OBJECTS OF THE INVENTION

Therefore, an object of the present invention is to provide an apparatus and a method for allowing messages to be recorded and replayed when desired, without any delay.

Another object of the invention is to provide a machine for temporarily storing messages, which machine is intended to be used in parallel with a magnetic tape logger.

Yet another object of the invention is to provide a device in which a selected message may be saved and later replayed by the operator at any desirable point.

Still another object of the invention is to provide a machine having an improved display for indicating the relative locations of temporarily stored messages and/or saved messages.

An additional object of the invention is to provide an apparatus for temporarily storing messages, and saving a selected message, that includes fault detection circuits for checking various components for proper operation.

A further object of the invention is to provide a message repeater for recording and replaying recently received communications without interrupting an associated magnetic tape logger.

A still further object of the invention is to provide a device with the ability to record a message and replay a message substantially simultaneously.

Another object of the invention is to provide a device having solid-state storage, which device is employed to record and playback telephone or radio conversations.

Various other objects, advantages and features of the present invention will become apparent from the ensuing detailed description, and the novel features will be particularly pointed out in the appended claims.

SUMMARY OF THE INVENTION

The present invention provides a message repeater that is compatible with existing magnetic tape loggers. A message repeater according to the invention may be used together with, or in "parallel" with, such a logger. A message repeater according to the invention includes circuits for converting the audio signals on a particular message channel into corresponding digital signals and circuits for storing those digital signals. Such a message repeater also includes circuits for selectively recalling the signals that are stored and circuits for converting the signals that are recalled into analog audio signals. The analog audio signals may be sent to a speaker, a headset, or another recording device, such as a cassette recorder. Preferably, the message repeater includes a display to indicate the relative locations of messages that are stored. Furthermore, such a message repeater preferably permits a particular message to be saved, whereby the particular message may be replayed when convenient for the operator.

In accordance with another aspect of the invention, a method for recording and replaying audio signals forming messages on a message channel is provided. The audio signals on the message channel are converted into corresponding digital signals, and the digital signals are stored in a storage device, such as a dynamic random-access memory ("DRAM") or other suitable storage device. Digital signals are selectively recalled from the memory, under operator control, and the recalled signals are converted into analog audio signals. The recalled signals may be those at the beginning of a message or the recalled signals may commence at any point within the message. The steps of converting the incoming audio signals and storing the corresponding digital signals may be accomplished substantially simultaneously with the steps of recalling the digital signals and converting the digital signals into analog audio signals. Hence, a message being recorded may be replayed as it is being recorded, or one message may be recorded while another message is being replayed.

A message repeater according to the invention preferably includes a display for providing indications relating to the stored messages, such as a selectively moveable cursor or index as well as an indication of the starting point for each stored message. The operator may move the cursor to select a desired message or portion of it for reproduction. In one embodiment, the display includes top and bottom lines, each formed from a plurality of segments, the top line denoting starting points for the stored messages, and the bottom line denoting the position of the cursor. In such a display, the energized segments in the top line may move from right to left across the display, with the spacing between the energized segments representing the lengths of messages remaining constant, as additional messages are recorded. That is, the message start indications "walk" from right to left across the display as additional messages are recorded. Once the message start indications reach the left edge of the display, they "march off" the display.

BRIEF DESCRIPTION OF THE DRAWINGS

The above and other objects, features, and advantages of the invention will become apparent upon consideration of the following detailed description of illustrative embodiments thereof, especially when taken in conjunction with the accompanying drawings, wherein.

DETAILED DESCRIPTION OF THE PREFERRED EMBODIMENTS

General Description

Figure 1:
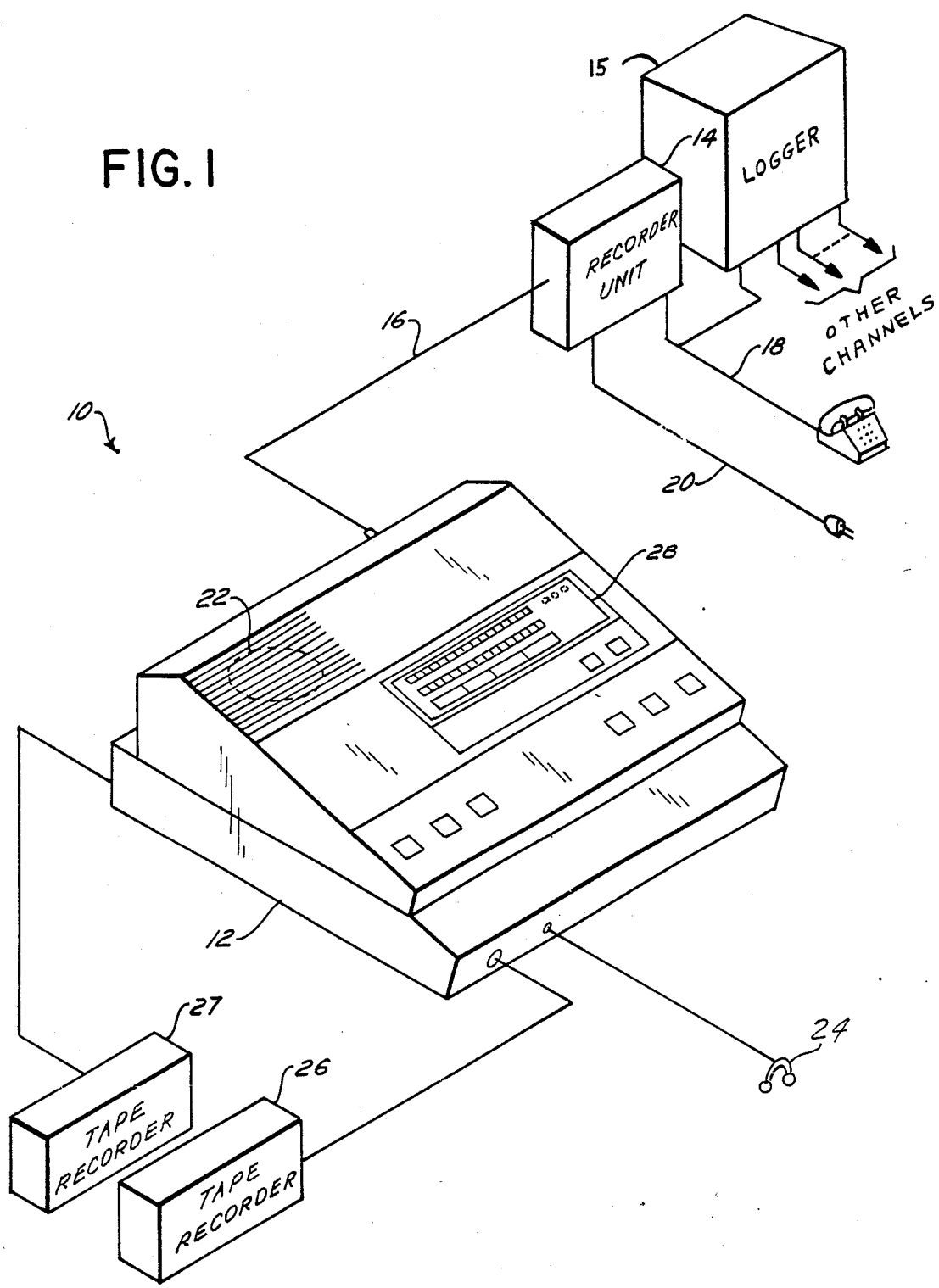
FIG. 1 is a diagrammatic illustration of a message repeater according to the invention.

Referring now to the drawings, and specifically to FIG. 1, a message repeater according to the invention is shown and designated generally by the reference numeral 10. The message repeater 10 includes a console 12 and a recorder unit 14. The recorder unit 14 is also referred to as the memory unit. The console 12 and the recorder unit 14 are connected by a line 16. Consequently, the console 12 and the recorder unit 14 may be located apart from one another. For instance, the console 12 may be conveniently positioned at the operator's station, while the recorder unit 14 may be placed in an equipment room. The message repeater 10 receives audio or voice communications over a telephone line 18. The telephone line 18 is an example of a message channel to which the message repeater 10 may be connected. The message repeater 10 may optionally be connected to receive signals from another type of message channel, such as a radio channel. The telephone line 18 is one of the telephone lines monitored by the conventional magnetic tape logger 15. The message repeater 10 receives A.C. power through a power line 20.

The console 12 has a speaker 22. The operator has the choice of listening to replayed messages through the speaker 22 or through a headset 24. The operator may connect a cassette recorder 26 to the console 12 in order to rerecord especially important messages. The use of the cassette recorder 26 to rerecord messages may be advantageous inasmuch as the recording time for the message repeater is ten minutes (or twenty minutes if an additional memory board is connected). Accordingly, the cassette recorder 26 provides further storage capacity, which may be desirable under certain circumstances.

Figure 2:
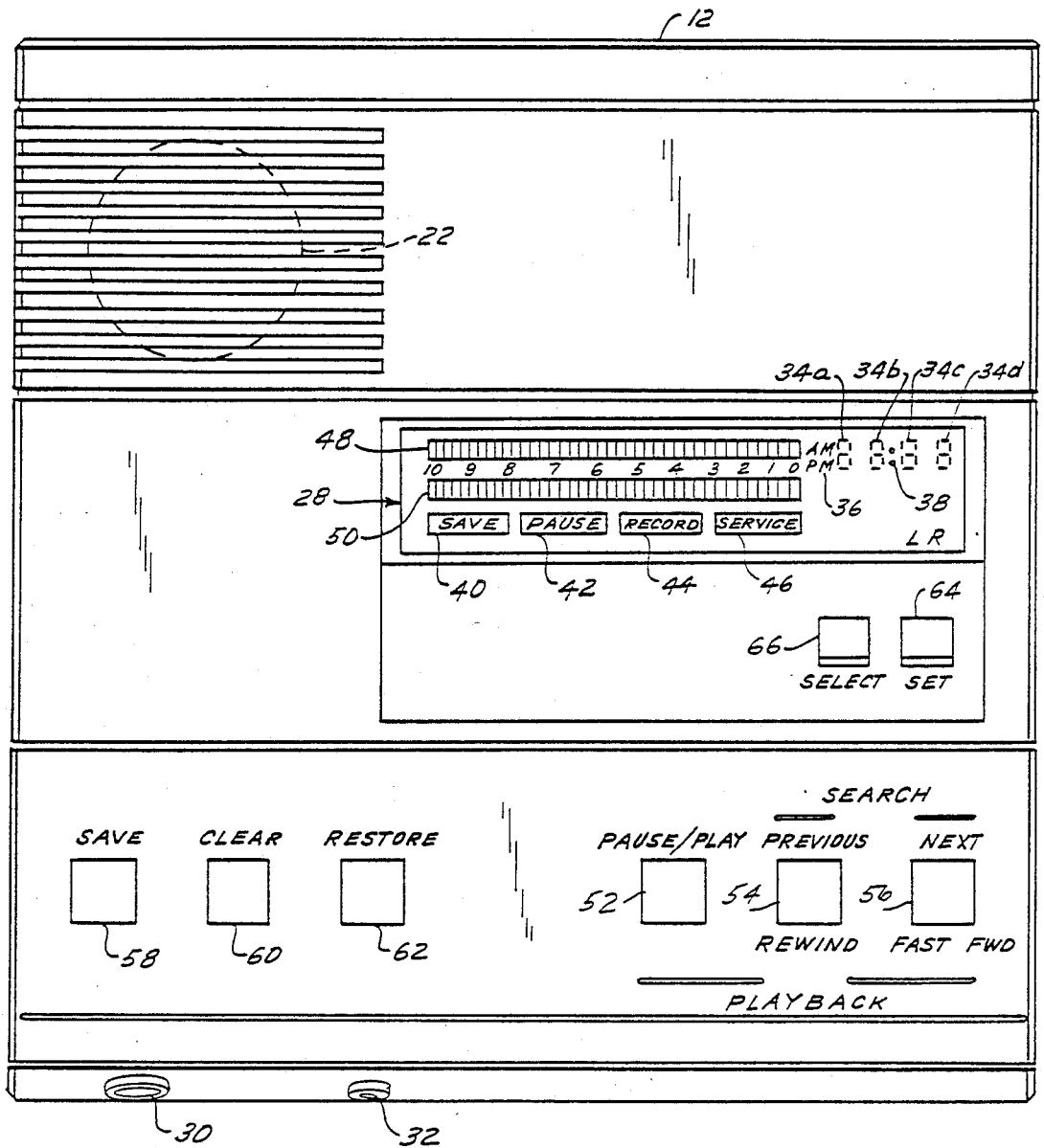
FIG. 2 is a perspective view of the console unit for the message repeater shown in FIG. 1.

FIG. 2 illustrates the console 12 in greater detail. The console 12 includes several buttons and a display 28. The console 12 additionally includes a jack 30 for connecting a cassette recorder and a jack 32 for connecting a headset. Another jack, not shown, is used for connecting the message repeater to another cassette recorder 27, which is shown in FIG. 1. The cassette recorder 27 would record the incoming audio signals in parallel with the magnetic tape logger and the message repeater.

The display 28 is a liquid crystal display ("LCD"). The display 28 includes four seven-segment indicators 34a–34d, an a.m./p.m. indicator 36, and a colon indicator 38. The display 28 also includes a SAVE legend 40, a PAUSE legend 42, a RECORD legend 44, and a SERVICE legend 46. A box formed of LCDs is energized around the perimeter of a legend to denote that the associated function or mode is effective.

The box around the RECORD legend is turned on whenever a message is coming into the record channel and associated signals are being stored. The box around the PAUSE legend is turned on when the operator pushes a pause/play button 52 on the console 12. The box around the PAUSE legend is turned off when the operator subsequently pushes the pause/play button 52. The box around the SAVE legend is lit whenever a selected message is saved. The box around the SERVICE legend will be illuminated when an error or fault is detected by the on-line diagnostics for the message repeater. The on-line and off-line diagnostics are explained at length below.

The display 28 has an upper multisegment bar graph 48 with vertical bars as well as a lower multisegment bar graph 50 with vertical bars. Each of the bar graphs 48 and 50 has sixty segments. The numerals 0 through 10 are located between the upper bar graph 48 and the lower bar graph 50. The numerals 0 through 10 are legends on the display 28.

The upper bar graph 48 is called the message index timeline. This timeline shows the relative locations and lengths of stored messages. Each of the sixty segments of the message index timeline 48 corresponds to ten seconds of record time. Thus, the entire message index timeline corresponds to ten minutes of record time, which is the nominal storage capacity of the message repeater. If the message repeater is equipped with the optional memory board to increase the storage capacity to twenty minutes, the message index timeline 48 displays the latest ten minutes of recorded messages.

At the start of message recording, the right-most timeline segment is illuminated on the message index timeline 48. For each ten seconds that pass during message recording, the left adjacent segment is illuminated.

The lower bar graph 50 is called the playback index timeline, and it shows the specific point within the message that is being recalled and played back. One of the sixty segments of the playback index timeline is energized to denote the position of an index or cursor. Every ten seconds during playback, the cursor moves to the right by one segment. A message can be recalled from its beginning or from any point between its beginning and its end. That is, all or part of a message may be "rewound" and then played back. The cursor of the playback index timeline 50 is controlled by buttons on the console 12, which are described below.

A pause/play button 52, a previous/rewind button 54, and a next/fast-forward button 56 are provided to permit the operator to control the position of the cursor and, therefore, the playback of messages. Momentary actuation of the pause/play button 52 stops playback of the accessed message. Another actuation of the pause/play button 52 causes playback of the accessed message to continue. When the pause/play button 52 is pressed, the box around the PAUSE legend is energized, and a message pause marker is energized on the display 48. The message pause marker indicates the location of the pause within the message being replayed. The pause function is cleared by depressing the pause/play button 52 a second time or by pressing the previous/rewind button 54 or the next/fast-forward button 56. Furthermore the pause function is cleared by pressing the restore button 62, which resets the cursor to its farthest advance point, i.e., to the rightmost segment of the playback index timeline 50.

If the previous/rewind button 54 is pressed and released within one second, the newest complete message is played back from its beginning. If the previous/rewind button 54 is again pressed and released within one second, the second newest complete message is played back from its beginning. Similarly, if the previous/rewind button 54 is again pressed and released within one second, the third newest complete message is played back from its beginning. In this fashion, the previous/rewind button may be employed to step the cursor from right to left to access any previously recorded message from its starting point. When a message is accessed or played back, the time associated with the beginning of that message is displayed by the seven-segment indicators 34a-34d. A nonblinking colon on the colon indicator 38 signifies that the displayed time is not the current time.

If the previous/rewind button 54 is pressed and held for longer than one second, the cursor continuously decrements, i.e., moves from right to left along the playback index timeline 50. An audible tone is generated as each message start boundary is passed. When the previous/rewind button 54 is released, the message repeater automatically goes into the play mode. Then, the message is replayed from the point determined by the cursor. Thus, any previously recorded message may be played back from its beginning or from any point between its beginning and its end.

If the next/fast-forward button 56 is pressed and released within one second, the next newest message is played back. This function operates only if at least one message has been accessed in the reverse direction, namely, to the left along the message index timeline 48. If the next/fast-forward button 56 is pressed while the cursor is at its farthest advance point, the message repeater will disregard this command. If the cursor is at its farthest advance point, and the message repeater is in the record mode, the incoming audio signals will be played back as they are received once the next/fast-forward button 56 is pressed and released within one second.

Assume that the cursor is positioned near the left boundary of the playback index timeline 50. The next/fast-forward button 56 may be pressed to move the cursor to the beginning of the next newest message, specifically, to move the cursor to the message start point for the first message to the right of the cursor. If the next/fast-forward button 56 is again pressed, the cursor moves to the beginning of the next newest message, namely, to the message start point for the second message to the right of the cursor's original position. Accordingly, the next/fast-forward button 56 may be pressed to step the cursor from message to message until the cursor reaches its farthest advance point, i.e., the rightmost segment of the playback index timeline 50.

If the next/fast forward button 56 is pressed and held for longer than one second, the cursor continuously increments, i.e., moves from left to right along the playback index timeline 50. An audible tone is generated as each message start boundary is passed. When the next/fast forward button 56 is released, the message repeater automatically goes into the play mode. Then, the message is replayed from the point determined by the cursor. The next/fast-forward button 56 is deactivated when the farthest advance point for the cursor is reached. At the farthest advance point, a continuous tone is generated until the next/fast forward button 56 is released.

If the save button 58 is pressed while the cursor on the playback index timeline 50 is within a message boundary on the message index timeline 48, the message repeater prevents that message from being erased. That is, the message repeater "write protects" the stored signals associated with the selected message. This feature allows an operator to refer back to the saved message without losing the information by having it recorded over. Only one message may be saved at any time, but the saved message may be stored for an indefinite period. The section of memory used for the saved message is dedicated for storage alone and cannot be used to write other information until the save message feature is cancelled. Accordingly, the length of recording time for other incoming messages is reduced by the length of the saved message. For example, if the saved message is two minutes long, the total remaining recording time for other incoming messages is reduced by two minutes. The length of the saved message is displayed on the message index timeline 48 by energizing all segments associated with the saved message.

Only one message may be saved at any time, as noted above. If a message has already been saved and the cursor on the playback index timeline 48 is within the boundary of another message, as shown by the message index timeline 50, actuation of the save button 58 will result in a playback of the saved message. When the save button 58 is pressed, the rectangular element around the SAVE legend is energized.

Once a message has been saved, the clear button 60 may be pressed to cancel the saved message feature. In order to prevent the inadvertent cancellation of this feature, however, the clear button 60 must be pressed and held for longer than one second in order to cancel the saved message feature.

The message repeater stores signals corresponding to messages in a so-called wraparound memory. (By "wraparound storage" herein is meant storage in a memory of predetermined size of a portion or portions of the audio signal previously recorded by a logger in such a manner that when the memory capacity is exceeded and additional signal is to be stored the oldest stored signal is deleted to provide room for the current signal.) Normally, data is stored starting with a certain location and continuing until the storage capacity of the memory is reached. At this point, subsequently received data is stored beginning with the starting location. In other words, after data is stored in the last memory location, new or fresh data is stored in the first and following locations. Hence, the new data is written over the old data, and the old data is lost. Consequently, if the message repeater has storage capacity for ten minutes of messages and more than ten minutes of messages are recorded, the oldest messages, or portions of them, are lost. Actuation of the save button 58 institutes write protection for the data associated with the saved message. Actuation of the clear button 60 removes the write protection for the data associated with the saved message.

When the clear button 60 is pushed, the rectangular element around the SAVE legend is deenergized. In addition, the segments of the message index timeline 48 corresponding to the previously saved message are deenergized as fresh data is written in the corresponding memory locations. The bar segments of the previously saved message appear to "walk" to the left. Full memory restoration is indicated when all of the bar segments are deenergized. Another message may not be saved until full memory restoration occurs. If the clear button 60 is pressed (and the write protection for a saved message is removed) and ten or fewer minutes of recording time have elapsed, the write protection for the previously saved message, or what remains of it, may be reinstituted by pressing the save button 58.

The restore button 62, when actuated, causes a playback or a pause to be cancelled. In other words, when the restore button 62 is pressed, the cursor is set to its farthest advance point on the playback index timeline 50, and the current pause or playback is cancelled.

The set button 64 and the select button 66 are employed in a conventional manner to set the time of day on the seven-segment indicators 34a-34d.

Block Diagrams

Figure 3:
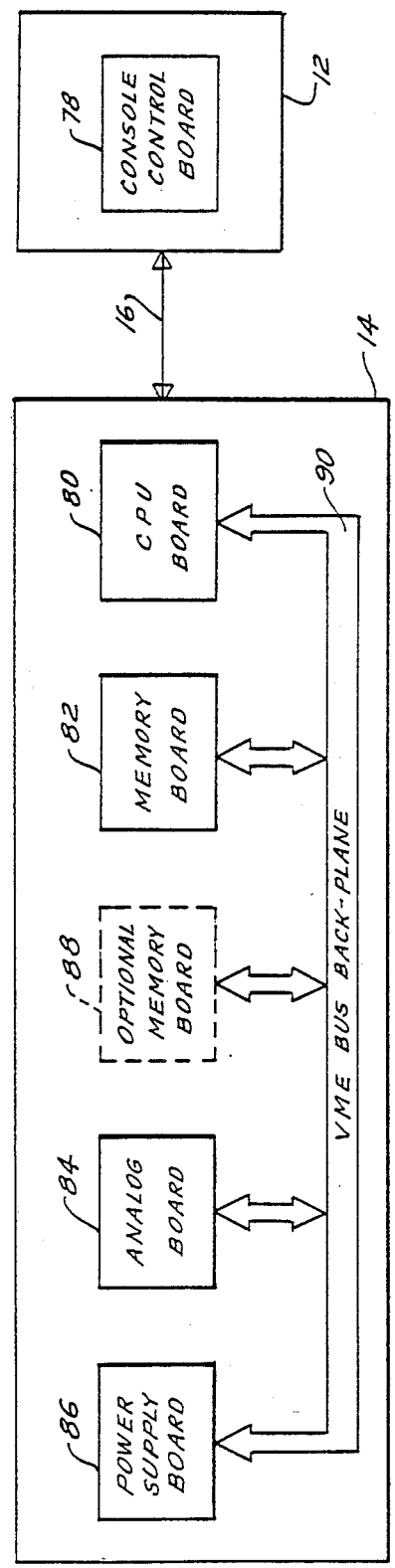
FIG. 3 is a block diagram of the message repeater shown in FIG. 1.

FIGS. 3 through 8 are block diagrams for a message repeater according to the invention. FIG. 3 is an overall block diagram for the message repeater and shows the console 12 connected to the recorder unit 14 by the line 16. The console 12 may be located up to 300 feet away from the recorder unit 14.

The console 12 has a console control board 78, while the recorder unit 14 includes a CPU board 80, a memory board 82, an analog board 84, and a power supply board 86. The recorder unit 14 may include an optional memory board 88. The optional memory board 88 doubles the storage capacity of the recorder unit 14 from ten minutes of recorded information to twenty minutes of recorded information. Thus, messages may be recorded for twice as long if both memory boards 82 and 88 are used than if only the memory board 82 is used. The boards 80-88 are connected by a VME bus along the blackplane of the recorder unit 14. The boards 78-88 are discussed in greater detail below during the descriptions of FIGS. 4 through 8.

Figure 4:
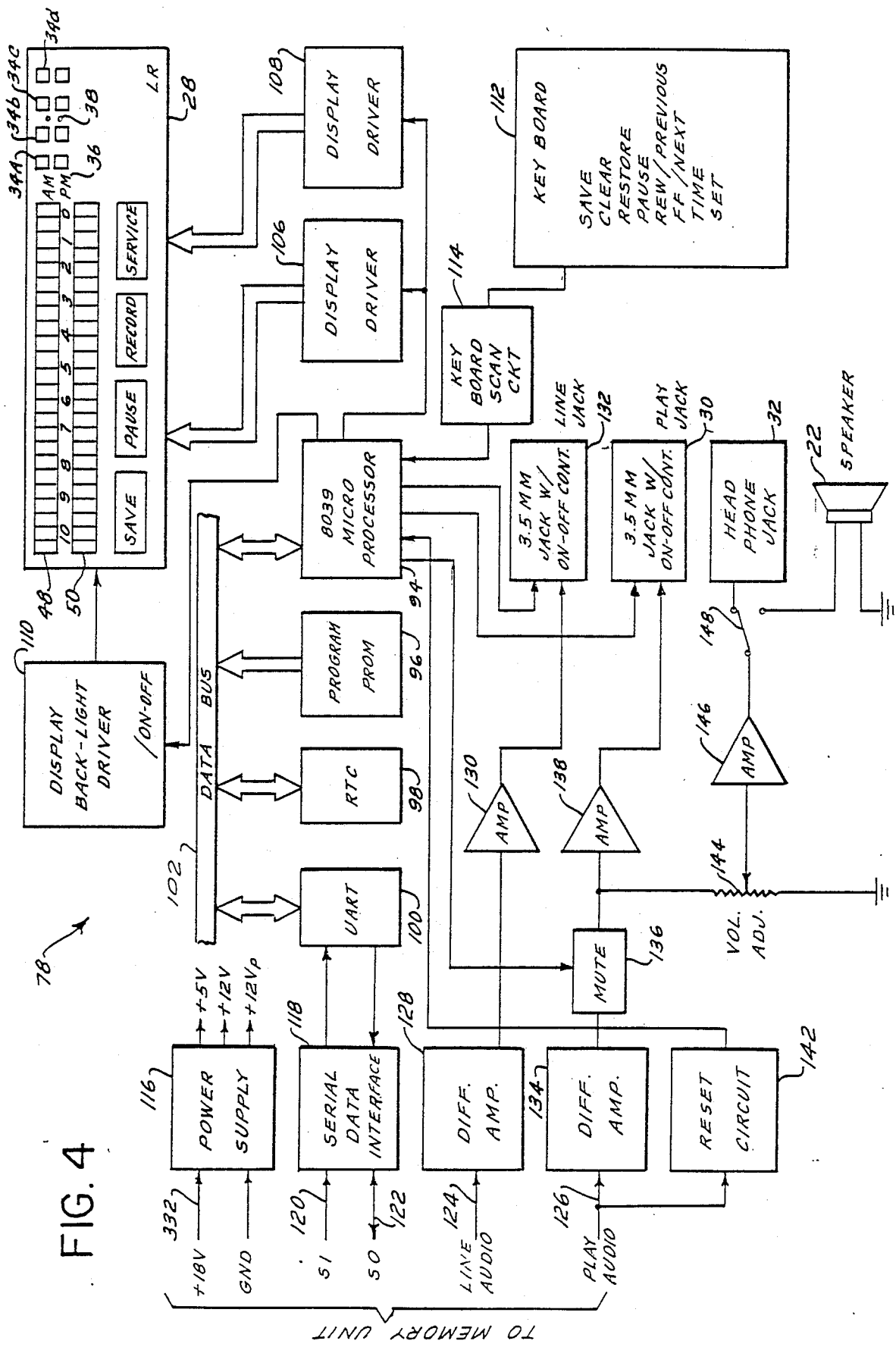
FIG. 4 is a block diagram of the console control board shown in FIG. 3.

FIG. 4 is a block diagram of the console control board 78 for the console 12. The console control board 78 includes a microprocessor 94, such as an Intel model number 8039 microprocessor. The microprocessor 94 is connected to a program PROM 96, a real time clock 98, and a universal asynchronous receiver-transmitter ("UART") 100 through a data bus 102. The microprocessor 94 controls the display 28 through display drivers 106 and 108 as well as through a back light driver circuit 110. Keyboard operation or initiation of the record mode causes the microprocessor 94 to recognize the operator's need to observe the display. Accordingly, the microprocessor 94 causes the back light driver circuit 110 to turn on the back light for the LCD display 28. The back light for the LCD display 28 is turned on and off in order to save power nd lengthen the life of the display.

The microprocessor 94 determines whether any buttons have been pressed by scanning the keyboard 112 through a keyboard scan circuit 114. The keyboard scan is accomplished by matrix scanning.

A power supply circuit 116 in the console control board 78 receives a +18 volt D.C. signal from the power supply board 86 of the recorder unit 14. The power supply circuit 116 converts the +18 volt D.C. signal from the power supply board 86 into +5 volt D.C. and +12 volt D.C. signals, which are supplied to the various components on the console control board 78.

The UART 100 is used to facilitate the transfer of information between the microprocessor 94 on the console control board 78 and the microprocessor on the CPU board 80. The UART 100 sends data to and receives data from a differential transceiver 118. The differential transceiver 118 is a conventional differential serial data interface. The differential transceiver 118, in turn, receives data from and delivers data to the CPU board 80 over a serial input ("SI") line 120 and a serial output ("SO") line 122, respectively.

The console control board 78 receives audio signals from the analog board 84 in the recorder unit 14. There are two audio channels: the playback channel and the record channel. The playback channel is used for replaying information that has been recorded, while the record channel is used for recording incoming information. The record channel is also known as the line channel because it is connected to the incoming signals on the telephone line.

The analog board 84 supplies a record audio signal over a line 124. The record audio signal is also referred to as the line audio signal. Furthermore, the analog board 84 provides a playback audio signal over a line 126. The record audio signal is initially sent through a differential receiver circuit 128 and subsequently sent through an amplifier 130 to a jack 132. The jack 132 is called the line jack. Another recording device, such as a cassette recorder, may be connected to the line jack 132 in order to record conversations as they take place.

The playback audio signal is initially sent through a differential receiver circuit 134, through a mute circuit 136, and subsequently through an amplifier 138 to the jack 30. The jack 30 is known as the play jack. Another recording device, such as a cassette recorder, may be connected to the play jack 30 in order to record messages, e.g., particularly important messages, as they are replayed. In addition, the playback audio signal is sent through a reset circuit 142 to the microprocessor 94. The microprocessor 94 controls the mute circuit 136 to prevent any signals at its input from reaching its output when the message repeater is not in the play mode.

A volume adjust potentiometer 144 is connected between the mute circuit 136 and the amplifier 138. The output signal from the volume adjust potentiometer 144 is delivered to an amplifier 146, which supplies an amplified signal to either the speaker 22 or the headphone jack 32. The signals on the playback audio line will be heard by the operator through the speaker 22, unless he or she plugs headphones into the headphone jack 32, which causes a switch 148 to deliver the audio signals to the jack 32 rather than the speaker 22. Consequently, the operator may listen to replayed messages through the speaker 22 or through headphones, depending on his or her wishes.

Figure 5:
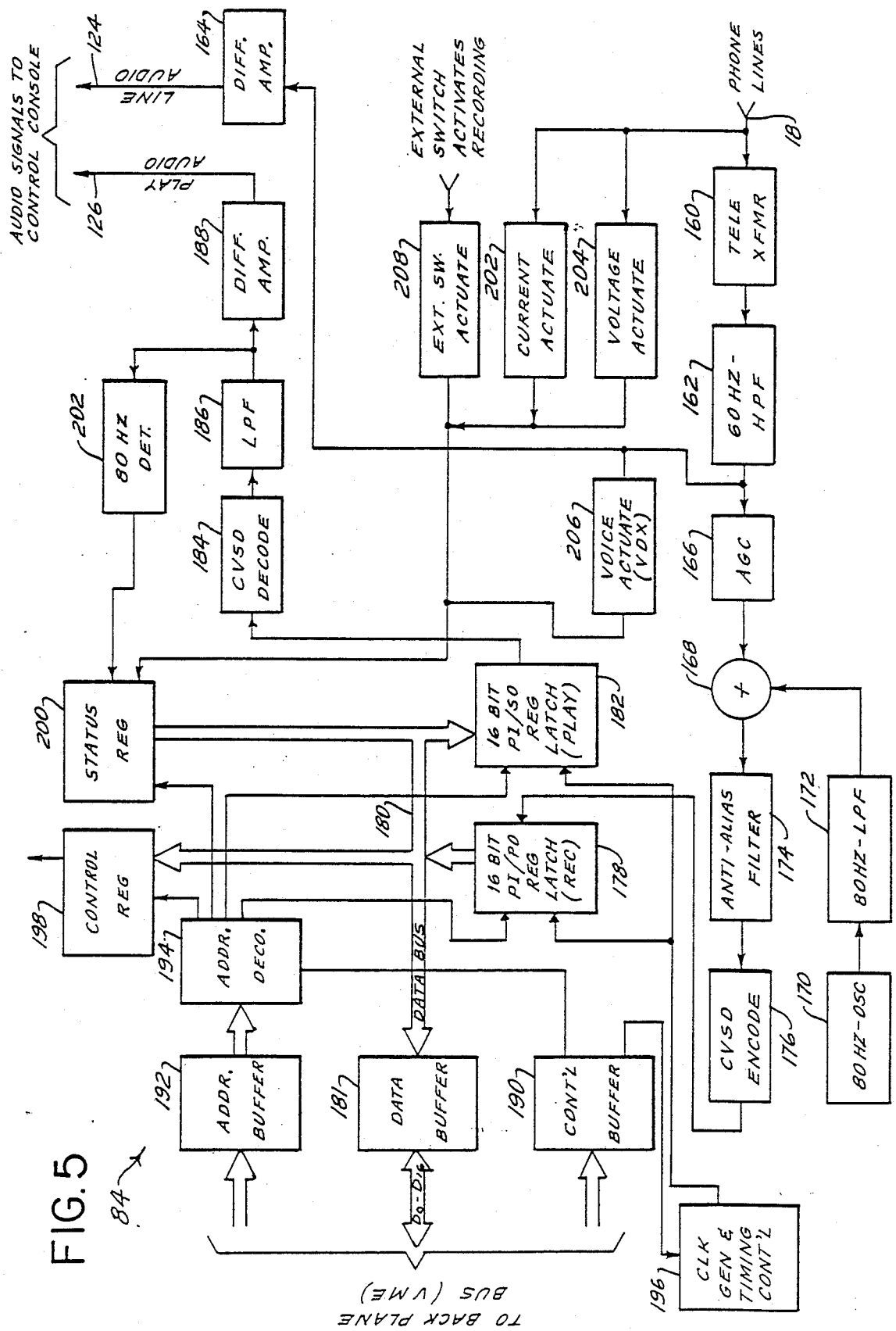
FIG. 5 is a block diagram of the analog board shown in FIG. 3.

FIG. 5 is a block diagram of the analog board 84 for the recorder unit 14. The analog board 84 receives audio signals over the telephone line 18. The telephone line 18 is one of the forty or more lines connected to the associated magnetic tape logger. The message repeater may be dedicated to a particular telephone line or radio channel. Alternatively, the message repeater may be switched from line to line or from channel to channel with a suitable switching device. The operator, therefore, may record messages from several different message channels by selectively changing the connection of the input line to the message repeater.

The audio signals on the telephone line 18 are delivered to a transformer 160, which provides isolation for the audio signals. Then, the audio signals are sent to a 60-Hz high-pass filter 162, which filters out any 60-Hz signals on the telephone line 18. The output signal from the 60-Hz high-pass filter 162 is delivered to a differential line driver amplifier 164. The output signal from the differential line driver amplifier 164 is the record audio signal. The record audio signal travels over the line 124 to the console control board 78 (FIG. 4). The output signal from the 60-Hz high-pass filter is also delivered to an automatic gain control ("AGC") amplifier 166. The AGC amplifier 166 is used to compress the signal quickly. The AGC amplifier 166 has a full-wave rectifier which converts the input A.C. signal into a D.C. signal. The output signal from the AGC amplifier 166 is sent to a summing amplifier 168. The other input of the summing amplifier 168 is supplied by an 80-Hz oscillator 170 through an 80-Hz low-pass filter 172. The 80-Hz oscillator 170 produces a square wave, and the 80-Hz low-pass filter 172 is a fundamental frequency filter. That is, the 80-Hz low-pass filter 172 permits only an 80-Hz sine wave to travel through it. The function of the 80-Hz signal will be described in greater detail below.

The output signal from the summing amplifier 168 is supplied to an anti-alias filter 174, which removes high-frequency distortion from the signal. The output signal from the anti-alias filter 174 is furnished to a continuously variable slope delta ("CVSD") encoder 176. A conventional CVSD encoder, such as the Harris model number 55564 encoder, may be employed. The CVSD encoder 176 converts the audio signal into serial digital data. The user has the option of selecting a 28 Kbit/second conversion rate or a 32 Kbit/second conversion rate.

The serial digital data from the CVSD encoder 176 is supplied to a 16-bit serial in/parallel out register latch 178. The register 178 is part of the record channel, as is the CVSD encoder 176. The digital data from the register 178 is supplied through a data bus 180 to a data buffer 181. Then, the digital data is sent through the data bus on the backplane to the memory board 82 (FIG. 6) and stored in the memory. Accordingly, audio signals on the telephone line 18 are converted into corresponding digital signals, which are stored in the memory, and which may be recalled in order to reproduce the audio signals.

FIG. 5 depicts the circuits used to reproduce the audio signals. Digital data is read from the memory and supplied through the data bus on the backplane to the data buffer 181. From the data buffer 181, the digital signals are supplied over the data bus 180 to a 16-bit parallel in/serial out register latch 182. The register 182 is part of the playback channel. The register 182 supplies serial output data to a CVSD decoder 184. The CVSD decoder 184 is part of the playback channel. The conversion rate of the CVSD decoder 184 matches the conversion rate of the CVSD encoder 176. The CVSD decoder 184 converts the input digital data into analog audio signals. The analog audio signals from the CVSD decoder 184 are sent through a low-pass filter 186 to a differential line driver amplifier 188. The output signal from the differential line driver amplifier 188 is the playback audio signal, which is transmitted to the console control board 78 (FIG. 4) over the line 126. In this manner, digital signals may be recalled from the memory and converted into analog audio signals. Thus, messages may be recorded and later replayed utilizing solid-state storage.

Control signals are supplied to the analog board 84 through the control bus on the backplane. The control signals are received by a control buffer 190. Similarly, address signals are supplied over the address bus on the backplane to an address buffer 192. The address buffer 192 then delivers the address signals to an address decoder 194. The control buffer 190 supplies control signals to the address decoder 194 and to a clock generator and timing control circuit 196. As mentioned above, the user has the ability to select the rate at which the incoming analog audio signals are encoded into digital signals and, correspondingly, the rate at which the recalled digital signals are decoded into outgoing analog audio signals. A signal indicative of the desired conversion rate is supplied by the clock generator and timing control circuit 196 to each of the registers 178 and 182. The address decoder also supplies signals to each of the registers 178 and 182. These signals from the address decoder 194 function to select each register independently for the CPU to access. The address decoder 194 supplies selected signals to the control register 198 as well as the status register 200. The signals from the address decoder function to select each register independently for CPU to access, to write control information to the control register, and to read status information from the status register An 80-Hz detector 202 is connected to the output of the low-pass filter 186. The 80-Hz detector 202 together with the 80-Hz oscillator 170 and the 80-Hz low-pass filter 172 are employed to check the audio circuitry of the message repeater. An 80-Hz signal from the 80-Hz oscillator 170 is introduced into the system at the summing amplifier 168. The 80-Hz signal is subsequently encoded by the CVSD encoder 176 and supplied to the memory, where it is stored. Later, the corresponding digital signals are read from the memory and decoded by the CVSD decoder 184. Accordingly, the presence of the 80-Hz signal indicates that the audio circuitry is operating satisfactorily, while the absence of the 80-Hz signal indicates that a fault exists in the audio circuitry. The 80-Hz detector 202, therefore, supplies a signal indicative of proper operation to the status register 200.

The status register 200 further receives a signal that tells the CPU to activate the record circuitry. This signal may be provided by, for example, a current actuation circuit 202 or a voltage actuation circuit 204 to detect an off-hook condition on the telephone line 18. In addition, a voice actuation ("VOX") circuit 206 may be used to detect the presence of audio signals on the telephone line 18 and activate the record circuitry. As another example, the user may furnish an external switching device for producing the signal which activates the record circuitry. The external switching device is diagrammatically shown by the block 208. Other techniques may be adopted to produce this signal. During installation, the user selects which circuit or device will be used to actuate the record circuitry.

Figure 6:
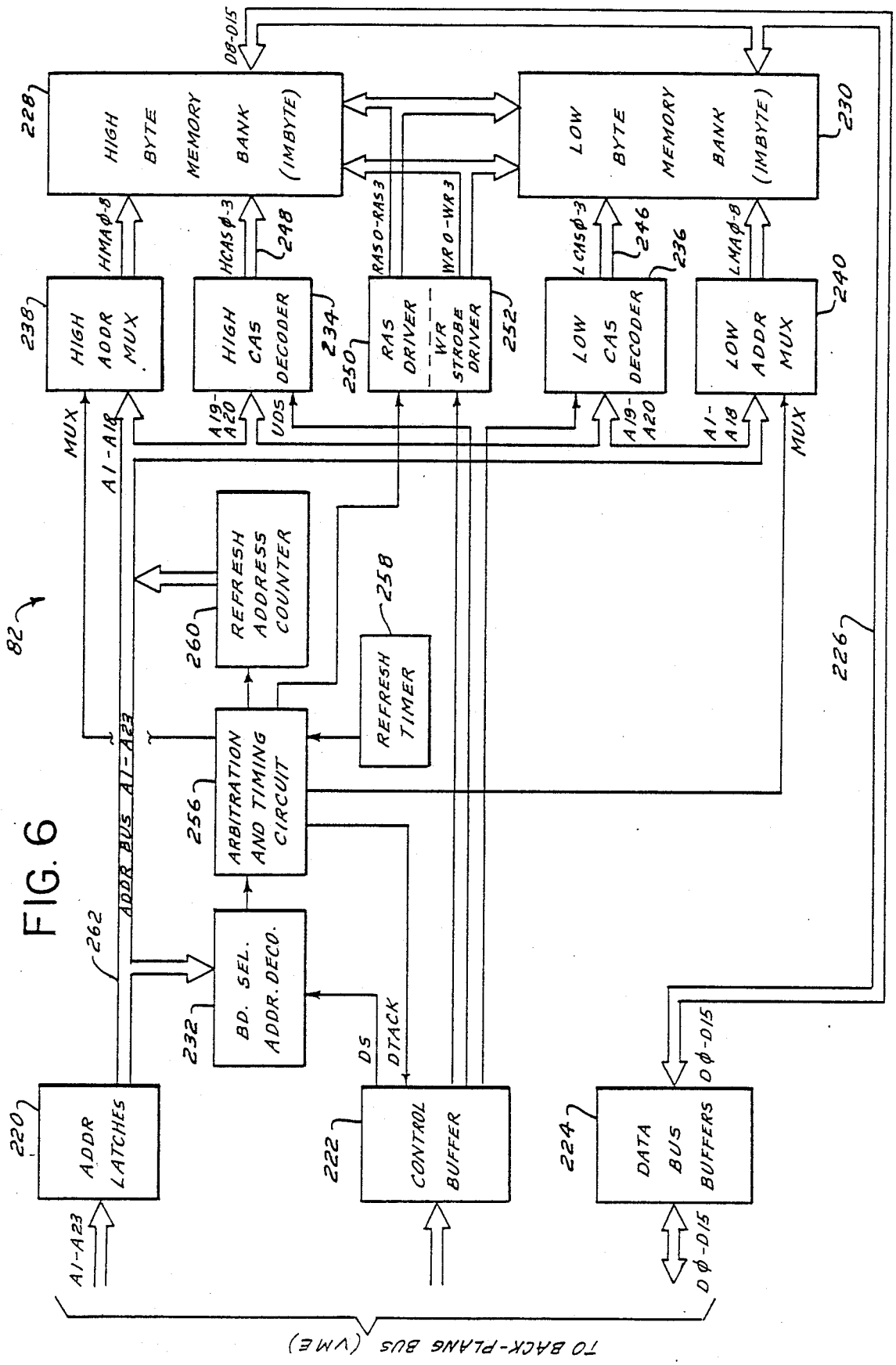
FIG. 6 is a block diagram of the memory board shown in FIG. 3.

FIG. 6 is a block diagram of the memory board 82 for the recorder unit 14. Address signals are supplied over the address bus on the backplane to address latches 220

Similarly, control signals are supplied to a control buffer 222 through the control bus on the backplane. Data bus buffers 224 receive data from either the data bus on the backplane or the data bus 226 on the memory board 82. A high byte memory bank 228 and a low byte memory bank 230 supply data to and receive data from the data bus buffers 224 through the data bus 226.

The high byte memory bank 228 and the low byte memory bank 230 comprise the main storage where the processed voice data is stored. The storage devices employed are eight 256 Kbyte dynamic random access memory modules ("DRAMs"). Four 256 Kbyte modules are located in the high byte memory bank 228 and four 256 Kbyte modules are located in the low byte memory bank 230. The total capacity on the memory board 82, therefore, is two megabytes, which corresponds to ten minutes of recorded information. If the optional memory board 88 is utilized, the message repeater has the capacity to record twenty minutes of information.

During a memory write operation, 16 bits are written into the DRAM. Similarly, during a memory read operation, 16 bits are read out from the DRAM. One byte from the high byte memory bank 228 and one byte from the low byte memory bank 230 together make up the 16 bits. Thus, one address on the address bus accesses one byte in the high byte memory bank 228 and one byte in the low byte memory bank 230.

The control buffer 222 provides several control signals to the components on the memory board 82. The control buffer 222 supplies a data strobe ("DS") signal to a board select or address decoder circuit 232. In addition, the control buffer 222 delivers an upper data strobe ("UDS") signal to a high column address strobe ("CAS") decoder 234 and a lower data strobe ("LDS") signal to a lower CAS decoder 236. Because of the relatively large amount of memory provided by the DRAM, two address multiplexers are employed. A high address multiplexer 238 provides address information to the high byte memory bank 228, while a low address multiplexer 240 provides address information to the low byte memory bank 230.

The row address strobe ("RAS") lines 242 control the row address of the DRAM, while the column address strobe ("CAS") lines 246 and 248 control the column address of the DRAM. A row address driver 250 supplies the row address signals to the row address strobe lines 242. A write strobe driver 252 supplies read/write signals to the read/write control lines 254. The signals on the read/write control lines 254 determine whether data is being read from or written to the DRAM.

In order to access a memory location, the CPU board 80 (FIG. 5) provides an address to the address latches 220 through the address bus on the backplane. The CPU board 80 supplies an address strobe ("AS") signal, which latches the address into the address latches 220. Next, the CPU board 80 furnishes the data strobe ("DS") signal to the control buffer 222 through the control bus on the backplane. The control buffer 222 then delivers the data strobe signal to the board select circuit 232. This circuit determines if the DRAM on this particular memory board has been selected. That is, it ascertains whether this particular memory board has been accessed for a read or write operation. This circuit permits the optional memory board 88 to be included in the message repeater.

Assuming that the DRAM in this particular memory board has been selected, the board select circuit 232 supplies a signal to an arbitration and timing circuit 256. If a memory refresh cycle (discussed below) is not occurring, the arbitration and timing circuit 256 causes the row address strobe driver 250 to supply a row address signal on the lines 242 to the DRAM. Next, the arbitration and timing circuit 256 delivers control signals to the high address multiplexer 238 and the low address multiplexer 240. The control buffer 222 delivers control signals to the high column address strobe decoder 234 and the low column address strobe decoder 236. The column address strobe decoders 234 and 236 then supply a column address signal to the DRAM. As noted before, the write strobe driver 252 furnishes a signal which determines whether data is read from or written to the DRAM.

The arbitration and timing circuit 256 then sends a data transfer acknowledge ("DTACK") signal to the control buffer 222, which supplies the DTACK signal to the CPU board 80 (FIG. 7) through the control bus on the backplane. Once the CPU board 80 receives the DTACK signal, the CPU board 80 ends the memory access cycle by relinquishing the address and the strobes. The state of the data strobe signal, therefore, is changed, which signifies to the board select circuit 232 that this particular memory board is no longer being accessed for a read or write operation.

Every four milliseconds, the DRAM is refreshed in order to maintain the stored data. The DRAM is refreshed during the memory refresh cycle. One memory refresh cycle refreshes the data in 256 addresses.

A refresh timer 258 counts clock signals from the CPU board 80, namely, 16-MHz clock signals. Every eight microseconds, the refresh timer 258 overflows and provides a signal to the arbitration and timing circuit 256, thereby initiating the memory refresh cycle. The arbitration and timing circuit 256 enables the refresh address counter 260 and disables the address latches 220. The contents of the refresh address counter 260 are then delivered to the address bus 262, the memory locations to be refreshed are accessed, and the row address strobes are activated. Subsequently, the arbitration and timing circuit 256 ends the refresh cycle and updates the refresh address counter 260.

Figure 7:
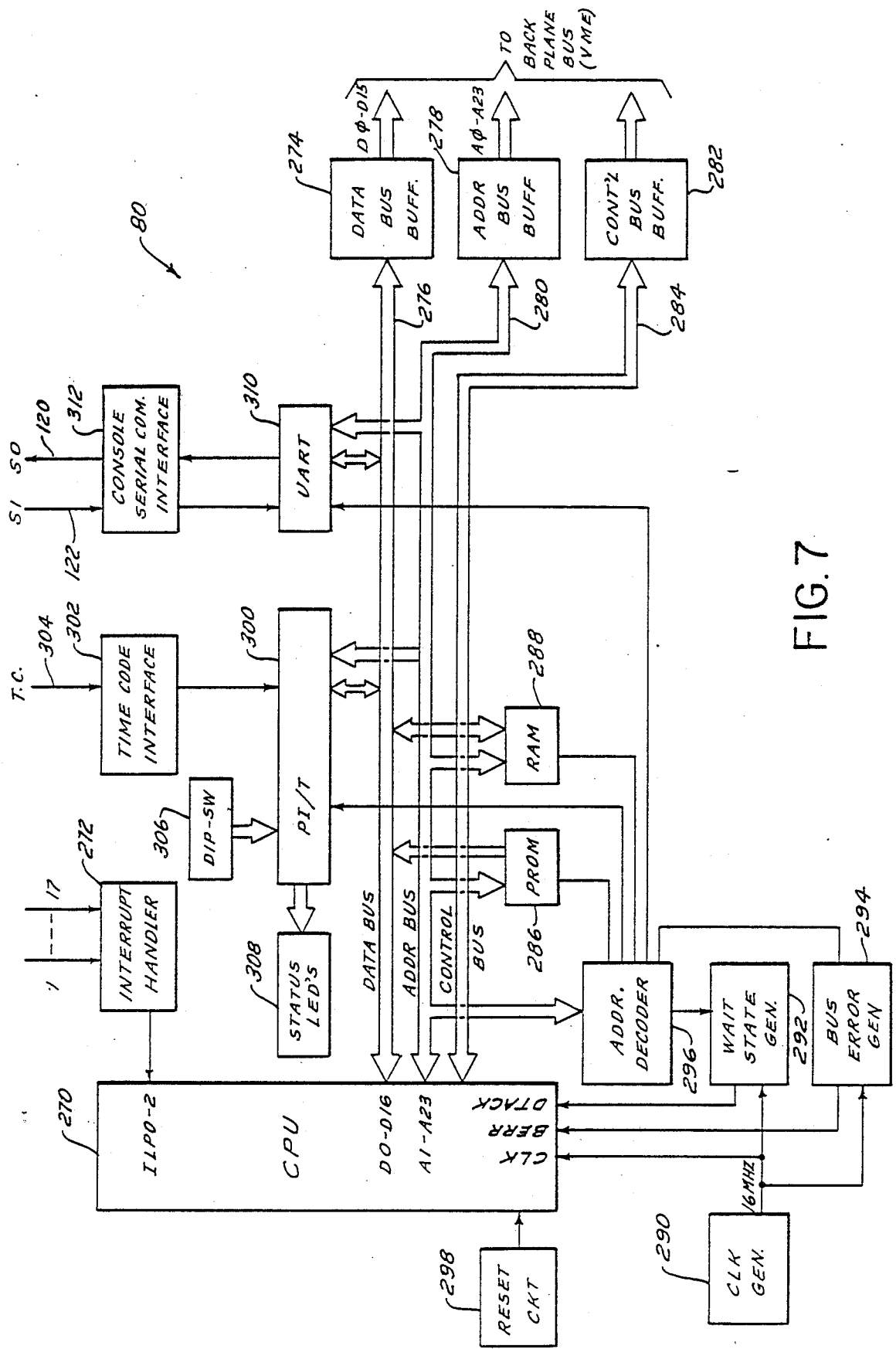
FIG. 7 is a block diagram of the CPU board shown in FIG. 3.

FIG. 7 is a block diagram of the CPU board 80 for the recorder unit 14. The CPU board 80 includes a microprocessor 270, such as a Motorola MC68000 microprocessor. An interrupt handler 272 prioritizes interrupts for the microprocessor 270. Flip-flops are used to latch the various interrupts. The interrupt handler 272 also keeps track of which interrupt has been recognized by the microprocessor 270.

The microprocessor 270 delivers data to and receives data from a data bus buffer 274 over a data bus 276. The data bus buffer 274 is connected to the data bus on the backplane. The microprocessor 270 delivers address signals to an address bus buffer 278 over an address bus 280. The address bus buffer 278 is connected to the address bus on the backplane. Furthermore, the microprocessor 270 delivers control signals to and receives control signals from a control bus buffer 282 over a control bus 284. The control bus buffer 282 is connected to the control bus on the backplane.

The microprocessor 270 supplies address signals to a programmable read-only memory ("PROM") 286. The PROM 286 then delivers data to the data bus 276. In addition, the microprocessor 270 supplies address signals to a random-access memory ("RAM") 288. The RAM 288 is a scratch-pad memory. The RAM 288 delivers data to the data bus 276. A clock generator 290 furnishes 16-MHz clock signals to the microprocessor 270, a wait state generator 292, and a bus error generator 294. An address decoder 296 is connected to the address bus 280. The address decoder 296 provides selected signals to the PROM 286, the RAM 288, the wait state generator 292, and the bus error generator 294.

The wait state generator 292 is started by the data strobe signal, which denotes the beginning of an access cycle. The wait state generator 292 is employed to accommodate the different access times of the PROM 286 and the RAM 288. In other words, the wait state generator 292 makes the speed of the PROM 286 and the speed of the RAM 288 compatible with the speed of the microprocessor 270. For instance, the wait state generator 292 holds the microprocessor 270 in a particular state until the PROM 286 outputs data onto the data bus 276 when the PROM 286 is accessed.

The bus error generator 294 is utilized to determine whether a problem exists with the transfer of data to or from the microprocessor 270. The bus error generator 294 includes a counter that counts for eight microseconds after the microprocessor 270 initiates an access cycle. If the access cycle is not acknowledged within the eight-microsecond period, the bus error generator 294 produces a bus error signal and supplies it to the microprocessor 270, which then takes appropriate action.

The microprocessor 270 communicates with other devices by supplying just an address or by supplying data together with an associated address. Then, the microprocessor 270 waits for the selected device to respond with a data transfer acknowledge signal ("DTACK"). The DTACK signal indicates to the microprocessor 270 that the selected device has accepted the data that was sent to it or that the device has supplied as an output the data that the microprocessor 270 has requested. When the PROM 286 or the RAM 288 is accessed, the wait state generator 292 controls the DTACK signal.

An automatic reset circuit 298 is provided. The automatic reset circuit 298 resets the microprocessor 270 when the message repeater is initially energized. The reset circuit 298 may also be actuated by the operator. For example, the operator may press a reset button (not shown) located in the recorder unit 14 in order to actuate the reset circuit 298.

A parallel interface/timer 300 communicates with the microprocessor 270 through the data bus 276 and the address bus 280. The parallel interface/timer 300 receives an input signal from a time code interface circuit 302. The magnetic tape logger to which the message repeater is connected supplies a time code ("TC") signal to the time code interface circuit 302 over a line 304. This time code signal may be used to provide the time display on the console 12. The manner in which the message repeater keeps track of time is discussed in greater detail below.

The parallel interface/timer 300 is connected to a DIP switch 306. The DIP switch 306 is utilized to denote various equipment configurations. Specifically, the DIP switch 306 supplies signals indicating whether the optional memory board 88 has been installed; whether the display is in a 12- or 24-hour format; and whether the rate at which the encoder and decoder operate is 28 Kbits/second or 32 Kbits/second. The parallel interface/timer 300 energizes status light-emitting diodes ("LEDs") 308. The status LEDs 308 are located inside the recorder unit 14 and are not normally seen by the operator. However, service personnel may open the recorder unit 14 and observe the status LEDs 308 after system diagnostics are performed, for example. The system diagnostics are described in greater detail below.

The microprocessor 270 communicates with the console control board 78 through a universal asynchronous receiver-transmitter ("UART") 310 and a differential transceiver 312. The differential transceiver 312 delivers serial output data to the differential transceiver 118 on the console control board 78 (FIG. 4) over the line 120. The serial output line for the differential transceiver 312 is the serial input line for the differential transceiver 118. The differential transceiver 312 receives serial input data from the differential transceiver 118 over the line 122. The serial input line for the differential transceiver 312 is the serial output line for the differential transceiver 118. Consequently, the microprocessor 270 on the CPU board 80 may communicate with the microprocessor 94 on the console control board 78. This communication is accomplished with the assistance of the UART 100, the UART 310, and the differential transceivers 118 and 312.

Figure 8:
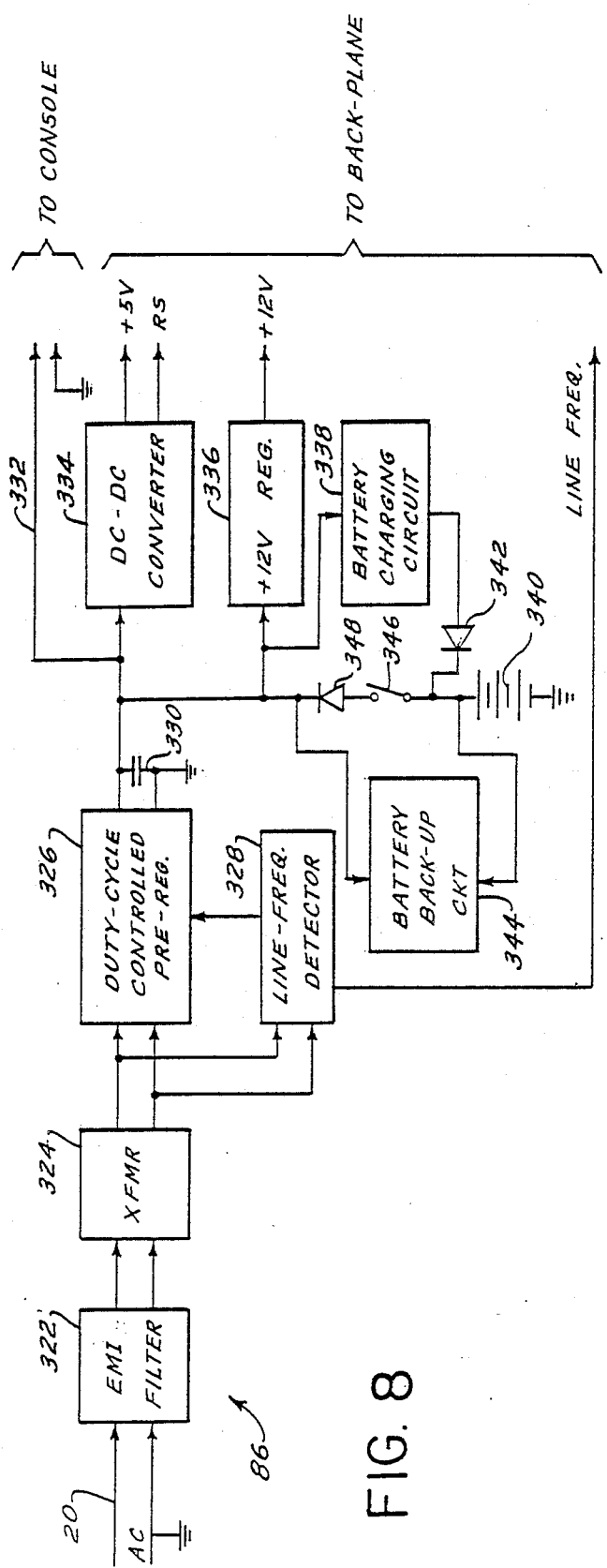
FIG. 8 is a block diagram of the power supply board shown in FIG. 3.

FIG. 8 is a block diagram of the power supply board 86 for the recorder unit 14. A source of A.C. power is connected to the power supply board 86 through the power line 20. A filter 322 removes electromagnetic interference. The A.C. signals are then supplied through a transformer 324 to a preregulator 326 and a line frequency detector 328. The preregulator 326 controls the duty cycle of the input A.C. signal to maintain the voltage on a capacitor 330 at +18 volts D.C. The line frequency detector 328 determines the zero crossings of the input A.C. signal and supplies a line frequency signal to the CPU board 80 (FIG. 7). The line frequency signal may be used to keep track of time, as described in greater detail below.

The +18 volt D.C. signal from the capacitor 330 is supplied to the console control board 78 (FIG. 4) over a line 332. In addition, the +18 volt D.C. signal is delivered to a D.C.-D.C. converter 334. The D.C.-D.C. converter 334 produces a +5-volt D.C. signal as well as a reset signal. The reset signal is supplied to the reset circuit 298 on the CPU board 80 (FIG. 7) when the message repeater is initially energized. The +18 volt D.C. signal from the capacitor 330 is sent to a regulator circuit 336, which produces a +12 volt D.C. signal. The +5 volt D.C. and +12 volt D.C. signals are used to energize the various components in the recorder unit 14.

The +18 volt D.C. signal is also supplied to a battery charging circuit 338, which charges a battery 340 through a diode 342. The battery 340 is utilized to provide power to the message repeater if the A.C. power source is lost. Lead-acid batteries, for example, may be employed. A battery backup switching circuit 344 senses when the A.C. power is lost and closes a switch 346, thereby connecting the battery 340 to the converter 334 and the regulator 336 through a diode 348. Hence, the message repeater may operate even after the A.C. power supply is removed.

Timekeeping

The seven-segment indicators 34a–34d show the time of day except when a message is being replayed. During replay, the start time of the message is shown on the seven-segment indicators 34a–34d. The colon indicator 38 is used to differentiate between a display of the actual time and a display of the message start time. The message start time is displayed with a nonblinking colon, while the actual time is displayed with a blinking colon.

Normally, the message repeater receives time information from the associated magnetic tape logger with which it is used. The magnetic tape logger supplies the time information to the time code interface 302 on the CPU board 80 (FIG. 7). This time information is used to display the actual time on the seven-segment indicators 34a–34d. Furthermore, when a message is stored in the DRAM, message start time information, from the magnetic tape logger, is also stored so that the message start time may be displayed on the seven-segment indicators 34a–34d when the message is played back.

If the time information from the magnetic tape logger is unavailable, a routine in the microprocessor 270 on the CPU board 80 (FIG. 7) counts the signals from the line frequency detector 328 on the power supply board 86 (FIG. 8) in order to keep track of time. That is, a routine in the microprocessor 270 uses the A.C. power source to keep track of time. This is a so-called software clock. The routine causes the microprocessor 270 to count the signals from the line frequency detector 328 in order to determine seconds, minutes, and hours. The microprocessor 270 on the CPU board 80 (FIG. 7) sends appropriate signals to the microprocessor 94 on the console control board 78 (FIG. 4). The microprocessor 94 then appropriately controls the display 28 to show either the actual time or a message start time.

Upon a loss of the A.C. power source, the real time clock 98 on the console control board 78 (FIG. 4) provides time information to the microprocessor 94, which then suitably controls the display 28.

System Diagnostics

When the message repeater is initially energized, a number of system diagnostics are performed. Initially, all segments and indicators on the display 28 are energized. If a certain segment or indicator is not energized, the operator visually observes a fault in this portion of the display and takes appropriate action. The operator then presses each of the keys 52 through 66. As each key is pressed, an associated portion of the display 28 is deenergized. After all of the keys 52 through 66 have been pressed, the display should be completely deenergized. If the display is not completely deenergized, the operator visually observes the faulty condition and takes suitable action.

Next, the operator actuates the save button 58, the clear button 60, the restore button 62, the pause/play button 52, and the previous/rewind button 54 to carry out other diagnostics. When the operator actuates the save button 58, the segments on the display are sequentially energized. The operator visually observes the display to determine whether two segments are energized simultaneously. If so, a short circuit exists between these two segments, and the operator takes appropriate action. The segments in the message index timeline 48 and the playback index timeline 50 are sequentially energized to enable the operator to determine whether a fault condition exists.

Following completion of the display diagnostic, described above, the operator actuates the clear button 60 to initiate a memory diagnostic. The DRAM on each memory board includes eight memory modules. By pressing the clear button 60, the operator causes a predetermined pattern of bits to be written to and then read from each memory location. After the bits are read from the memory location, they are compared with the bits that were written to the memory location. If the bits do not correspond, the memory location is determined to be bad and is not used for storing message information.

The display 28 provides a visual indication to the operator of the memory diagnostic. In the preferred embodiment, the segments in the timelines 48 and 50 above and below the legends 1 through 8 flash for a duration of about 2.5 to about 5.0 minutes while the memory diagnostic is being carried out. When the memory diagnostic is finished, a tone is emitted by the speaker 22, and the segments above the legends 1 through 8 remain energized. If a particular memory module has failed, the segment above the associated legend will not be illuminated. As an example, if the memory module associated with the legend 6 is faulty, the segment above the legend 6 is deenergized, while the segments above the legends 1 through 5 and 7 and 8 are turned on. If the message repeater includes the optional memory board 88, segments in the playback index timeline 50 also are used. The segments in the playback index timeline 50 below the legends 1 through 8 correspond to the eight memory modules in the optional memory board 88. If a module in the optional memory board 88 is faulty, the segment below the legend associated with this memory module will not be illuminated after the memory diagnostic is completed.

The operator actuates the restore button 62 to initiate a diagnostic of the audio circuitry in the console 12. When the operator presses the restore button 62, a 600-Hz signal is injected into the audio circuitry in the console 12. A corresponding tone should be heard by the operator through the speaker 22 or through connected headphones. If this tone is not heard, the operator takes suitable corrective action.

The operator actuates the pause/play button 52 to institute a diagnostic of the audio circuitry in the recorder unit 14. The 80-Hz oscillator 170, the 80-Hz low-pass filter 172, and the 80-Hz detector 202 on the analog board 84 (FIG. 5) are employed to perform this diagnostic. The operation of these circuits is described above. If the 80-Hz detector 202 senses the 80-Hz signal, the seven-segment indicators 34a–34d are energized to show the word "pass." However, if the 80-Hz detector 202 does not sense the 80-Hz signal, the seven-segment indicators 34a–34d show the word "fail."

The operator actuates the previous/rewind button 54 in order to exit the off-line diagnostic mode.

When the message repeater is in the operating or on-line mode, two diagnostics are performed. The 80-Hz circuitry tests the analog circuits of the analog board except when the message repeater is in the record mode or the playback mode. If the equipment fails the 80-Hz test, the box around the SERVICE legend on the display is energized. In addition, when the message repeater is not in the record mode or the playback mode, the memory diagnostic is performed. That is, a predetermined pattern of bits is written to and read from the locations in the DRAM. After the pattern of bits is read from the memory, it is compared with the pattern of bits that was written to the memory. If a discrepancy exists, that portion of the memory is flagged as faulty, and the box around the SERVICE legend is energized along with the letter "R." The letter "R" informs the operator that the DRAM has failed the memory diagnostic and that appropriate corrective action is required. The on-line 80-Hz test and the on-line memory diagnostic are performed at different times inasmuch as they each require data to be written to and read from the DRAM. The on-line 80-Hz test is performed in response to an interrupt, while the on-line memory diagnostic is carried out by a background routine.

Furthermore, if the microprocessor 94 on the console control board 78 tries to communicate with the CPU board 80 five times and is unsuccessful, the box around the SERVICE legend is energized along with the letter "L." The letter "L" informs the operator that a fault condition exists on the line.

Flowcharts

FIGS. 9 through 14 are flowcharts for the routine and subroutines that process a record or playback interrupt.

As background, a circular doubly linked list is the data structure employed to store memory address information for the DRAM. A linked list is composed of nodes, and three types of nodes are used for the routine and subroutines illustrated in FIGS. 9 through 14. Each type of node contains a forward pointer, an information field, and a backward pointer. The backward pointer points to the previous node in the list, while the forward pointer points to the following node in the list. The three types of nodes used in the routine and subroutines illustrated in FIGS. 9 through 14 are a record index, a linked list record, and a playback index record.

The record index includes a backward pointer; information designating the next available storage address in the DRAM; a secondary forward pointer that points to a saved message, if one exists; and a forward pointer. The record index is the first node in the list. A linked list record is used for each recorded message. Each linked list record includes a backward pointer; information designating the beginning address of the message in the DRAM; a flag for indicating whether the message is a saved message; a flag for indicating whether the message is continued around a saved message; a flag for indicating whether the message is a continuation around a saved message; information designating the location of start-of-message segment on the display; information indicating the time the message was received; information designating the end address of the message in the DRAM; and a forward pointer. The playback index record includes a backward pointer; information concerning the next playback address; and a forward pointer. The information concerning the next playback address is called the current playback index, and corresponds to the position of the cursor along the playback index timeline. During the playback mode, if the current playback index equals the current record address, the incoming message is replayed as it is received.

Figure 9:
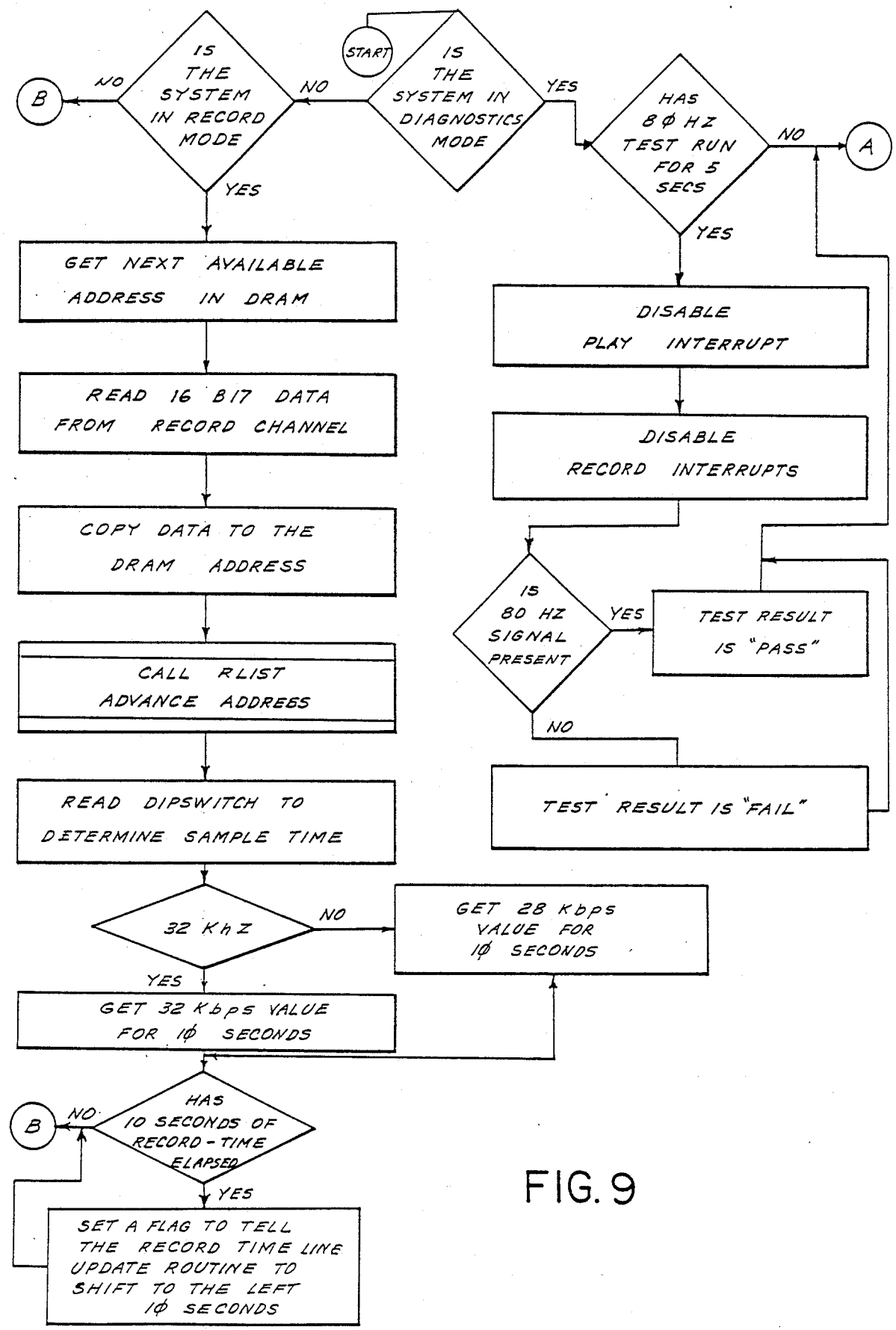
FIGS. 9 through 14 are flowcharts of routines carried out by microprocessors in the message repeater shown in FIG. 1.

FIG. 9 depicts the initial portion of the routine that services a record or playback interrupt. When such an interrupt is received, the routine tests to determine whether the message repeater is in the diagnostics mode. If so, the routine then tests to determine whether the 80-Hz test is being performed. If the 80-Hz test is being run, the playback interrupt is disabled, and then the record interrupt is disabled. Subsequently, the routine checks to see whether an 80-Hz signal has been detected by the 80-Hz detector. If the 80-Hz detector senses the 80-Hz signal, the routine causes a "pass" indication to be displayed, but if the 80-Hz detector does not sense the 80-Hz signal, the routine causes a "fail" indication to be displayed. After the 80-Hz test is either passed or failed, the routine returns from the interrupt, as shown by the point A in the flowchart.

After another interrupt is received, the routine again checks to see whether the message repeater is in the dignostics mode. If the message repeater is not in the diagnostics mode, a check is made to determine whether the message repeater is in the record mode. Assume that the message repeater is in the record mode. Then, the next available storage address in the DRAM is obtained. The next available storage address is also referred to as the current record address. After this address is obtained, the data to be stored in this address is read from the record channel. Specifically, 16 bits from the record channel are copied into the DRAM at the address previously obtained. Thereafter, the RLIST, or record list, subroutine is called.

Figure 11:
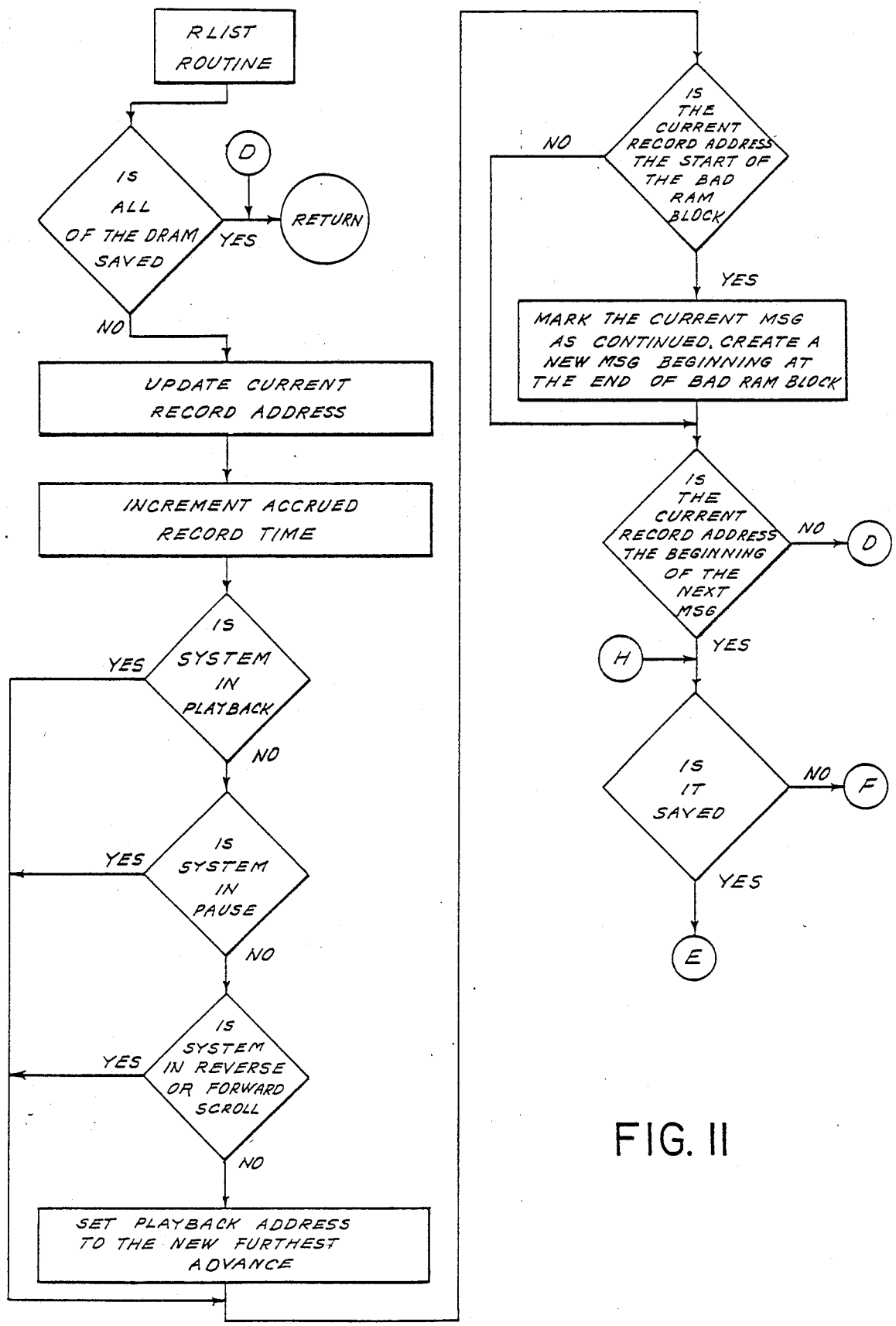
Figure 12:
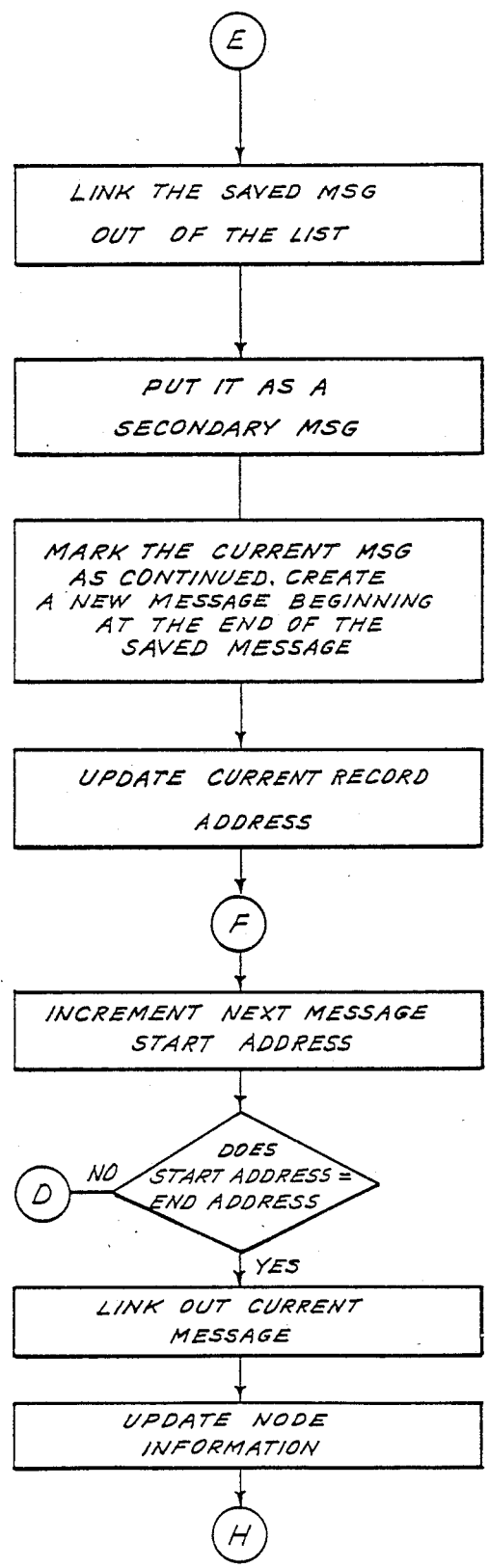

The RLIST subroutine is shown in FIGS. 11 and 12. Initially, the RLIST subroutine ascertains whether the entire contents of the DRAM have been saved. If so, the RLIST subroutine returns to the main routine because no storage space is available. But if the entire DRAM has not been saved, the current record address is updated. In addition, a memory location containing the accrued record time is incremented to denote that additional data has been recorded. Then, the subroutine performs three tests to determine whether the message repeater is in the playback mode, the pause mode, the rewind mode, or the fast-forward mode. These tests are performed in order to ascertain how the message index timeline and the playback index timeline should be updated. If the message repeater is in none of these modes, the current playback index (cursor position) is set to correspond to the farthest advance point.

After these tests and, if necessary, an update of the current playback index, the RLIST subroutine determines whether the current record address is part of a bad DRAM block. At this point, the current record address corresponds to the next storage location. If the current record address is part of a bad DRAM block, the RLIST subroutine sets a flag to signify that the current message is to be continued around the bad DRAM block. This is accomplished by creating a new message that begins at the end of the bad DRAM block. If the current record address is not part of a bad DRAM block, no action is taken.

Subsequently, the RLIST subroutine checks to determine whether the current record address is the beginning of the next message. If the current record address is not the beginning of the next message, the RLIST subroutine returns to the main routine. However, if the current record address is the beginning of the next message, then the RLIST subroutine determines whether that message has been saved. If that message has been saved, the RLIST subroutine links the saved message out of the list and treats it as a secondary message. Then, the RLIST subroutine sets a flag to indicate that the current message is continued, and it creates a new message beginning at the end of the saved message. Next, the subroutine updates the current record address to point to a location after the saved message.

The RLIST subroutine then increments the beginning address of the next message, which means that the start of the next message will be recorded over. The step of incrementing the start address of the next message is also performed if the current record address is equal to the beginning address of the next message but the next message is not a saved message. Following the incrementing step, the RLIST subroutine tests to see whether the start address of the current message equals the end address of the current message. When the start address of the current message equals the end address of the current message, the entire message has been recorded over. In other words, the current message is no longer in the system. The RLIST subroutine then links out the current message, and then updates the node information. Once the node information has been updated, the RLIST subroutine again checks to see whether the current message is a saved message. This transfer of control by the RLIST subroutine is shown by the points H in the flowchart.

Figure 10:
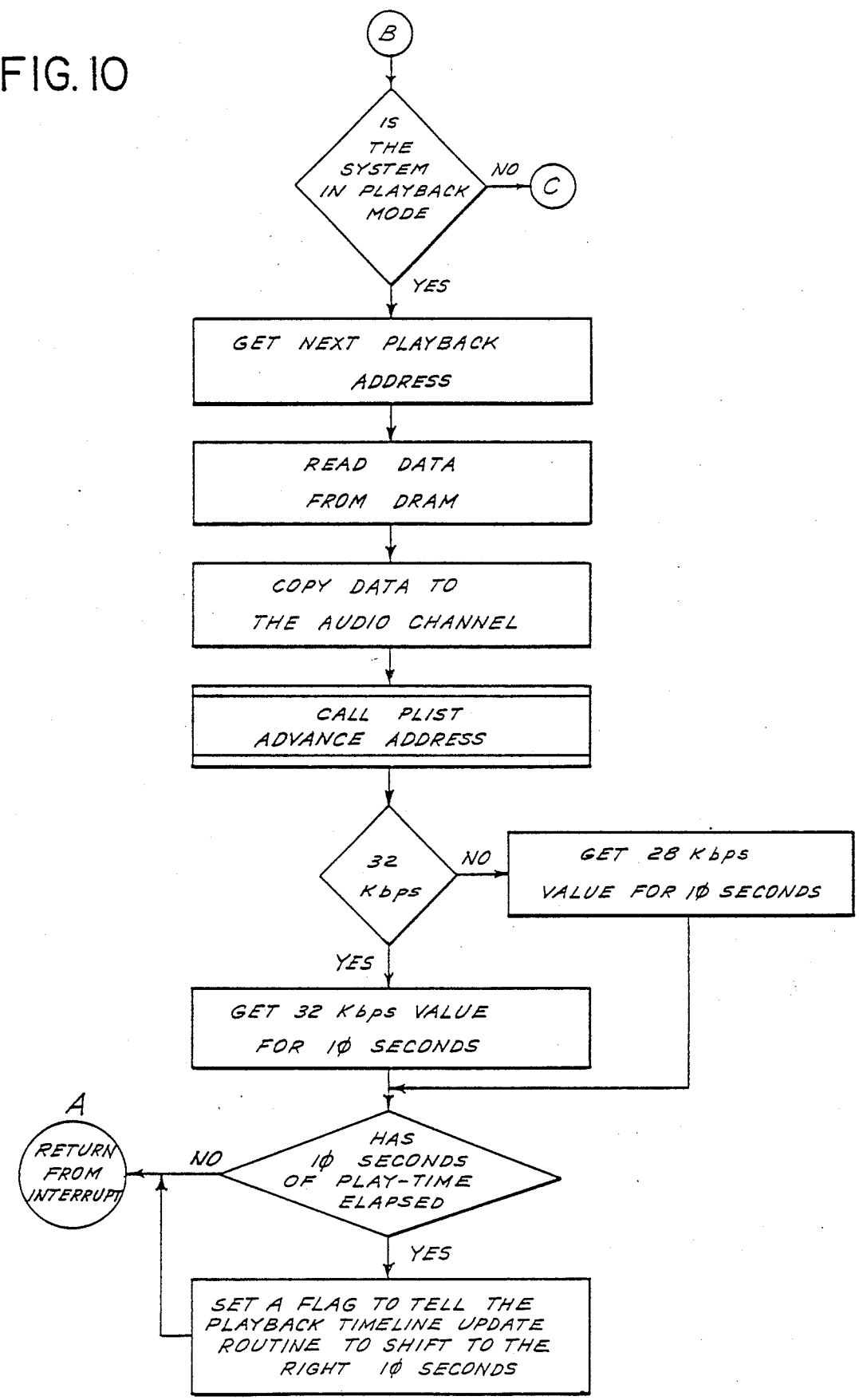

Following a return from the RLIST subroutine to the main routine shown in FIG. 9, the main routine reads the setting on the DIP switch. The DIP switch may be set so that the CVSD conversion rate is 28 Kbits/second or 32 Kbits/second, as explained above during the description of the analog board 84. The DIP switch is read in preparation for updating the message index timeline. If the CVSD conversion rate is 28 Kbits/second, the routine reads one value from memory, and if the CVSD conversion rate is 32 Kbits/second, the routine reads another value from memory. The value read from memory is employed to determine when ten seconds of record time have elapsed. The message index timeline is updated every ten seconds of record time. For instance, the message start indications move one segment to the left for every ten seconds of record time. Accordingly, the routine tests to determine whether the accrued record time equals the value read from memory. If so, a flag is set to indicate that the message index timeline should be updated by shifting the energized segments to the left. If the accrued record time does not equal the value read from memory, the routine determines whether the message repeater is in the playback mode (FIG. 10).

Figure 14:
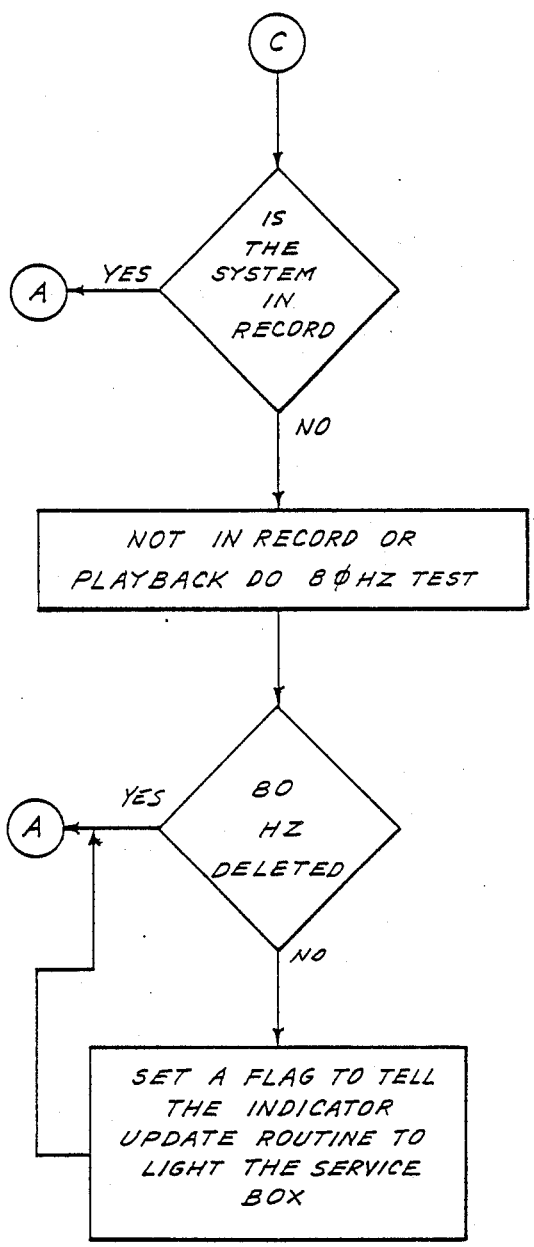

The step of testing to determine whether the message repeater is in the playback mode may also be performed initially after the routine checks to determine whether the message repeater is in the diagnostics mode and whether the message repeater is in the record mode. If the message repeater is not in the playback mode, the routine transfers control as indicated by the points C in the flowchart (FIGS. 10 and 14). If the message repeater is in the playback mode, the current playback address is obtained. Then, a memory read operation is performed, and the data at this address is read from the DRAM. This data is then supplied to the playback channel. Next, the main routine calls the PLIST, or playback list, subroutine.

Figure 13:
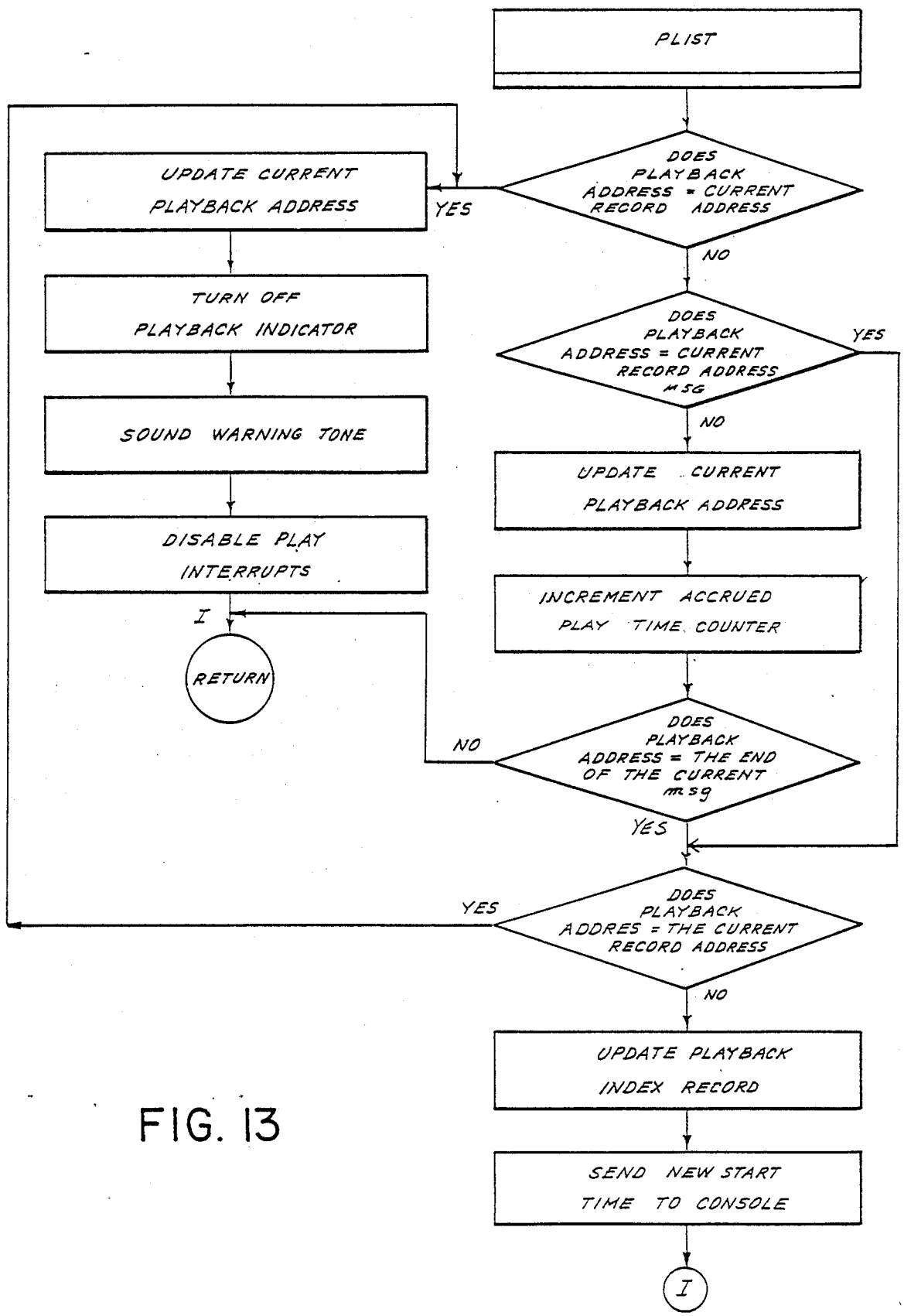

FIG. 13 shows a flowchart for the PLIST subroutine. Initially, the PLIST subroutine checks to determine whether the current playback address equals the current record address. This condition means that the latest recorded message has been replayed. When this condition occurs, the PLIST subroutine updates the current playback address, turns off the playback indicator, sounds a warning tone, and disables the playback interrupt. After these steps are accomplished, the PLIST subroutine returns to the main routine.

However, if the current playback address does not equal the current record address, the PLIST subroutine tests to determine whether the current playback address equals the end of the current message. If not, the PLIST subroutine updates the current playback address and increments the accrued play time counter. Subsequently, the PLIST subroutine ascertains whether the current playback address equals the end of the current message. If not, the PLIST subroutine returns to the main routine. However, if the current playback address now equals the end of the current message, the subroutine determines whether the current playback address equals the current record address. When the current playback address equals the current record address, the latest recorded message has been replayed, as indicated above. If the current playback address equals the current record address, the PLIST subroutine updates the current playback address, turns off the playback indicator, sounds a warning tone, and disables the playback interrupt.

The second test to determine whether the current playback address equals the current record address is also accomplished if the current playback address equals the end of the current message. If the playback address does not equal the current record address after the second test, the forward pointer and the backward pointer of the playback index record are updated, and a new message start time is sent to the console. Then, the PLIST subroutine returns to the main routine.

Following a return from the PLIST subroutine to the main routine shown in FIG. 10, the main routine determines whether the CVSD conversion rate is 28 Kbits/second or 32 Kbits/second. If the conversion rate is 28 Kbits/second, one value is read from memory, and if the conversion rate is 32 Kbits/second, another value is read from memory. The value read from memory corresponds to ten seconds of elapsed play time at the conversion rate utilized by the CVSD encoder and decoder. The routine uses the value read from memory to determine if ten seconds of play time have elapsed. If so, a flag is set to cause an update of the playback index timeline. Specifically, the playback index or cursor moves one segment to the right for every ten seconds of play time. After the flag is set, or if ten seconds of play time have not elapsed, the routine returns from the interrupt.

Once a record or playback interrupt is received, the routine tests, first, to see if the message repeater is in the diagnostics mode; second, to see if the message repeater is in the record mode; and, third, to see if the message repeater is in the playback mode. If the answer to all three tests is no, then the routine transfers control to the section starting with point C in FIG. 14. Following a transfer of control to this point, the routine again checks whether the message repeater is in the record mode. If so, the routine returns from the interrupt. However, if the message repeater is not in the record mode, the routine initiates the 80-Hz test. Then, the routine inquires whether an 80-Hz signal has been detected. If so, the routine returns from the interrupt. If an 80-Hz signal has not been detected, the routine sets a flag that causes the box around the SERVICE legend to become illuminated.

The above description of the flowchart for processing a record or playback interrupt shows that the message repeater is capable of recording and replaying messages substantially simultaneously. The audio signals on the record channel are converted into digital signals, and 16 bits of data are stored in the DRAM during a memory write operation. Similarly, 16 bits of data are read from the DRAM during a memory read operation, and the recalled digital signals are converted into analog audio signals. The step of writing 16 bits to the DRAM may be followed by the step of reading 16 bits from the DRAM. Thus, a particular message may be recorded and replayed at the same time. Moreover, one message may be recorded, while a different message is being replayed. The operator may select the message that is being replayed from any message stored in the DRAM. In particular, the operator may position the cursor with the buttons 52–56 on the console 12 to access any message or any portion of any message.

Although particular illustrative embodiments of the invention have been described herein with reference to the accompanying drawings, the invention is not limited to these particular embodiments. Various changes and modifications may be made thereto by those skilled in the art without departing from the spirit or scope of the invention, which is defined by the appended claims.

We claim:

1. A system for recording and replaying messages, comprising:
    logging means for concurrently recording audio signals in analog form from a message channel;
    encoding means for converting the audio signals of messages on the channel into corresponding digital signals;
    memory means for wraparound storage of the digital signals corresponding to portions of the audio signals, recorded by the logging means;
    write means for writing the digital signals into the memory means;
    recall means for selectively recalling the digital signals from the memory means; and
    decoding means for converting the digital signals recalled from the memory means into analog audio signals.

2. A system as recited in claim 1, further comprising display means for displaying indications of the messages stored in the memory means.

3. A system as recited in claim 2, wherein the display means includes a selectively movable index and means for displaying an indication corresponding to a starting point for each message, and wherein the recall means is responsive to a signal representative of the position of the index.

4. A system as recited in claim 3, wherein the display means includes first and second arrays of energizable segments, a segment in the first array being energized to denote the starting point of a respective message, and a segment in the second array being energized to denote the position of the index.

5. A system as recited in claim 4, further comprising means for selectively checking the display means, the checking means including means for sequentially energizing each segment in the first and second arrays.

6. A system as recited in claim 1, further comprising means for generating a relatively low audio frequency signal and means for detecting the relatively low audio frequency signal; wherein the relatively low audio frequency signal is converted by the encoding means, stored in the memory means, recalled by the recall means, converted by the decoding means, and then supplied to the detecting means.

7. A system as recited in claim 1, further comprising means for preventing selected digital signals stored in said memory means from being changed, the selected digital signals corresponding to a selected message, whereby the selected message is saved.

8. A system as recited in claim 1, wherein the write means and the recall means are operable substantially simultaneously.

9. A system as recited in claim 1, further comprising means for selecting as the message channel a particular channel from a plurality of channels.

10. A method for recording and replaying audio messages which are concurrently being recorded on an analog logger, comprising the steps of:
    selecting a particular one of the channels of said logger on which audio signals are provided;
    converting the audio signals on the particular channel into corresponding digital signals;
    storing the digital signals corresponding to a portion of the messages recorded on the logger in memory means in wraparound form;
    selectively recalling digital signals from the memory means; and
    converting the digital signals recalled from the memory means into analog audio signals.

11. A method as recited in claim 10, further comprising the step of displaying, on a display means, indications of the messages stored in the memory means.

12. A method as recited in claim 11, wherein the displaying step includes displaying an indication corresponding to a starting point for each message and displaying a positionable cursor, and wherein the recalling step is performed in response to a signal representative of the position of the cursor.

13. A method as recited in claim 12, wherein the displaying step includes displaying a first line formed from a plurality of segments and displaying a second line formed from a plurality of segments, a segment in the first line being energized to denote the starting point of a message and a segment in the second line being energized to denote the position of the cursor.

14. A method as recited in claim 13, further comprising the step of selectively checking the display means for sequentially energizing each segment in the first line and each segment in the second line.

15. A method as recited in claim 10, further comprising the steps of generating a relatively low audio frequency signal and detecting the relatively low audio frequency signal, and wherein the first converting step includes converting the relatively low audio frequency signal into corresponding digital signals, the storing step includes storing the last-mentioned digital signals, the recalling step includes recalling the last-mentioned digital signals, the second converting step includes converting the last-mentioned digital signals into analog audio signals, and the detecting step includes detecting the last-mentioned analog audio signals.

16. A method as recited in claim 10, further comprising the step of preventing selected digital signals stored in the memory means from being changed, the selected digital signals corresponding to a selected message.

17. A method as recited in claim 10, further comprising the step of selectively detecting a fault in the operation of components performing at least one of first converting, storing, recalling, and second converting steps and additionally comprising the step of displaying an indication if a fault is detected.

18. A method as recited in claim 10, wherein the storing and recalling steps are performed substantially simultaneously.

19. An apparatus for recording and replaying audio signals concurrently being recorded on an analog logger, comprising:
    encoding means for converting the audio signals on a selected channel of the logger into corresponding digital signals;

memory means for wraparound storage of the digital signals corresponding to a portion of the audio signals recorded by the logger;

recall means for selectively recalling the digital signals from said memory means;

decoding means for converting the digital signals recalled from said memory means into analog audio signals;

clock means for producing signals representative of time; and display means, responsive to said clock means, for displaying indications representative of present time of day and time at which a message was received.

20. An apparatus as recited in claim 19, wherein the clock means is responsive to an A.C. power source.

21. An apparatus as recited in claim 20, further comprising secondary clock means for producing signals representative of time, the display means being responsive to said secondary clock means upon a loss of the A.C. power source.

22. An apparatus as recited in claim 19, wherein signals corresponding to a message start time are stored in the memory means and recalled from the memory means when the associated message is replayed.

23. A method for recording and replaying audio signals concurrently being recorded on an analog logger, comprising the steps of:

converting the audio signals on a selected channel of the logger into corresponding digital signals;

storing the digital signals corresponding to a portion of the audio signals recorded by the logger in a memory means in wraparound format;

selectively recalling the digital signals from the memory means; and converting the digital signals recalled from the memory means into analog audio signals;

wherein the steps of converting the audio signals and storing are accomplished substantially simultaneously with the steps of recalling and converting the digital signals.

24. A method as recited in claim 23, wherein the steps of converting the audio signals and storing are performed on signals associated with a particular message and wherein the steps of recalling and converting the digital signals are performed on signals associated with the particular message.

25. A method as recited in claim 23, wherein the steps of converting the audio signals and storing are performed on signals associated with a first message and the steps of recalling and converting the digital signals are performed on signals associated with a second message.

26. A method as recited in claim 25, further comprising the step of selecting the second message from a plurality of messages, signals associated with each message being stored in said memory means.

27. An apparatus for recording and replaying audio signals concurrently being recorded on an analog logger, comprising encoding means for converting the audio signals on a selected channel of the logger into corresponding digital signals;

memory means of finite storage capacity for storing the digital signals corresponding to a portion of the audio signals recorded by the logger and for replacing the oldest stored digital signals with current digital signals after the storage capacity is reached;

recall means for selectively recalling the digital signals from the memory means;

decoding means for converting the digital signals recalled from the memory means into analog audio signals; and means for selectively saving a particular message comprised in the stored digital signals, even after the storage capacity is reached.

28. An apparatus as recited in claim 17, wherein the memory means includes a multiplicity of memory locations and the saving means includes means for designating particular locations associated with the particular message.

29. An apparatus as recited in claim 28, wherein the multiplicity of locations includes a first location and a last location; wherein digital signals are stored in successive locations starting at the first location, the location following the last location being the first location; and wherein said means for designating particular locations includes means for preventing current digital signals from being stored in said particular locations associated with said particular message.

30. An apparatus as recited in claim 29, wherein current digital signals associated with a subsequent message are stored in locations preceding and following said particular locations.

31. A method for recording and replaying audio signals concurrently being recorded on an analog logger, comprising the steps of:

converting the audio signals on a selected channel of the logger into corresponding digital signals;

storing the digital signals corresponding to a portion of the audio signals recorded by the logger in memory means of finite storage capacity and replacing the oldest stored digital signals with current digital signals after said storage capacity is reached;

selectively recalling the digital signals from the memory means;

converting the digital signals recalled from the memory means into analog audio signals; and selectively saving a particular message.

32. A method as recited in claim 31, wherein the saving step includes designating particular locations associated with the particular message from a multiplicity of memory locations in the memory means.

33. A method as recited in claim 32, wherein the multiplicity of locations includes a first location and a last location; wherein the storing step includes storing digital signals in successive locations starting at the first location, the location following the last location being the first location; and wherein the saving step includes preventing current digital signals from being stored in said particular locations associated with said particular message.

34. A method as recited in claim 33, wherein the storing step includes storing current digital signals associated with a subsequent message in locations preceding and following said particular locations.

35. An apparatus for recording and replaying audio signals concurrently being recorded on an analog logger, comprising:

encoding means for converting the audio signals on a selected channel of the logger into corresponding digital signals;

memory means for storing the digital signals corresponding to a portion of the audio signals recorded by the logger in wraparound form;

recall means for selectively recalling the digital signals from the memory means;

decoding means for converting the digital signals recalled from the memory means into analog audio signals; and display means for displaying indications of the messages comprised of the digital signals stored in the memory means.

36. An apparatus as recited in claim 35, wherein the display means includes a selectively positionable cursor and means for displaying an indication corresponding to a starting point for each stored message, and wherein the recall means is responsive to a signal representative of the position of the cursor.

37. An apparatus as recited in claim 36, wherein said display means includes a first line formed from a plurality of energizable segments and a second line formed from a plurality of energizable segments, means for energizing a segment in the first line to denote the starting point for the associated message, and means for energizing a segment in the second line to denote the position of the cursor.

38. An apparatus as recited in claim 37, further comprising means for shifting the energized segments in the first line from right to left across the display, with the spacing between remaining constant, as additional digital signals are stored.

39. An apparatus for recording and replaying audio signals concurrently being recorded on an analog logger, comprising:

encoding means for converting the audio signals on a selected channel of the logger into corresponding digital signals;

memory means for wraparound storage of the digital signals corresponding to a portion of the signals recorded by the logger;

recall means for selectively recalling the digital signals from said memory means;

decoding means for converting the digital signals recalled from the memory means into analog audio signals;

means for selectively checking for proper operation of at least one of the encoding means, the memory means, the recall means, and the decoding means; and display means, responsive to the checking means, for providing an indication if improper operation is detected.

40. An apparatus as recited in claim 39, wherein the checking means includes means for generating a relatively low audio frequency signal; means for supplying the relatively low audio frequency signal to the encoding means such that said relatively low audio frequency signal is converted into digital signals for storage in said memory means, for recall by said recall means, and for conversion by said decoding means; and means for detecting the relatively low audio frequency signal converted by said decoding means.

41. An apparatus as recited in claim 40, wherein the relatively low audio frequency signal is continuously converted by the encoding means, stored in said memory means, recalled by the recall means, converted by the decoding means, and detected by the detecting means except when signals corresponding to a message are being recorded or replayed.

42. An apparatus as recited in claim 39, wherein the display means includes a first line formed from a plurality of segments and a second line formed from a plurality of segments, a segment in the first line being energized to denote a starting point for a message, a segment in the second line being energized to denote the position of a cursor; and wherein the checking means includes means for sequentially energizing each segment in the first line and each segment in the second line.

43. An apparatus as recited in claim 39, further comprising means for providing a predetermined pattern of bits to a selected location in said memory means, wherein the recall means is responsive to said pattern providing means and recalls data from the selected location, and additionally comprising means for comparing the data recalled from the selected location with the predetermined pattern of bits.

44. A system as described in claim 1 further comprising means for selecting the digital signals written into the memory means to correspond to portions of the audio signals comprising messages.

45. A method as described in claim 23 further comprising the step of selecting the digital signals to be stored in the memory means to correspond to portions of the audio signals comprising messages.

* * * * *